United States Patent
Liu et al.

(10) Patent No.: US 11,153,934 B2
(45) Date of Patent: Oct. 19, 2021

(54) INFORMATION PROCESSING METHOD AND DEVICE

(71) Applicant: HUAWEI TECHNOLOGIES CO., LTD., Guangdong (CN)

(72) Inventors: Xing Liu, Shenzhen (CN); Chunhua You, Shanghai (CN); Qufang Huang, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 1 day.

(21) Appl. No.: 16/579,643

(22) Filed: Sep. 23, 2019

(65) Prior Publication Data
US 2020/0022221 A1    Jan. 16, 2020

Related U.S. Application Data

(63) Continuation of application No. PCT/CN2018/080150, filed on Mar. 23, 2018.

(30) Foreign Application Priority Data

Mar. 24, 2017   (CN) .......................... 201710184659.0

(51) Int. Cl.
*H04W 92/10*    (2009.01)
*H04W 28/02*    (2009.01)
(Continued)

(52) U.S. Cl.
CPC ....... *H04W 92/10* (2013.01); *H04W 28/0278* (2013.01); *H04W 72/10* (2013.01); *H04W 80/02* (2013.01)

(58) Field of Classification Search
CPC ......... H04W 72/1284; H04W 28/0278; H04W 72/1247; H04W 72/1263; H04W 28/10;
(Continued)

(56) References Cited

U.S. PATENT DOCUMENTS 8,638,724 B1   1/2014 Knoop et al.
9,674,867 B2 *  6/2017 Lee ................... H04W 72/1284
(Continued)

FOREIGN PATENT DOCUMENTS

CN   102056332 A    5/2011
CN   102264098 A    11/2011
(Continued)

OTHER PUBLICATIONS

3GPP TSG RAN WG2 Meeting #87bis,R2-144407:"ProSe-BSR Triggering and Cancelling Mechanisms and Text Proposals",Huawei, HiSilicon,Shanghai, China, Oct. 6 Oct. 10, 2014,total 6 pages.

*Primary Examiner* — Wutchung Chu
(74) *Attorney, Agent, or Firm* — Womble Bond Dickinson (US) LLP

(57) ABSTRACT

This application provides a method including: determining, by a terminal device from at least one radio interface technology, a first radio interface technology used to send first information, where each of the at least one radio interface technology corresponds to an uplink resource, and the first information includes a size of to-be-sent data of at least one logical channel of the terminal device; and determining, by the terminal device based on the first information and attribute information of the first radio interface technology, whether to cancel the first information that is in a triggered state, where the attribute information of the first radio interface technology includes a priority of the first radio interface technology or an uplink resource corresponding to the first radio interface technology. The method provided in this application improves accuracy of canceling the first information that is in the triggered state, and shortens a data sending delay.

8 Claims, 10 Drawing Sheets

---

A terminal device determines, from at least one radio interface technology, a first radio interface technology used to send first information, where each radio interface technology corresponds to an uplink resource, and the first information includes a size of to-be-sent data onf at least one logical channel of the terminal device     — S101

The terminal device determines, based on the first information and attribute information of the first radio interface technology, whether to cancel the first information that is in a triggered state, where the attribute information of the first radio interface technology includes a priority of the first radio interface technology or an uplink resource corresponding to the first radio interface technology     — S102

(51) Int. Cl.
*H04W 72/10* (2009.01)
*H04W 80/02* (2009.01)

(58) Field of Classification Search
CPC . H04W 72/1242; H04W 28/04; H04W 28/06; H04W 36/28; H04W 72/10; H04W 80/02; H04W 92/10; H04L 47/30
See application file for complete search history.

(56) References Cited

U.S. PATENT DOCUMENTS

| | | |
|---|---|---|
| 2008/0159135 A1 | 7/2008 | Caram |
| 2010/0329204 A1 | 12/2010 | Guo et al. |
| 2011/0055387 A1* | 3/2011 | Tseng ................ H04W 72/1221 709/224 |
| 2012/0039263 A1* | 2/2012 | Moberg ............ H04W 72/1284 370/329 |
| 2012/0314672 A1* | 12/2012 | Chen .................. H04W 74/002 370/329 |
| 2014/0038629 A1* | 2/2014 | Iwamura ........... H04W 72/1284 455/452.1 |
| 2014/0064219 A1 | 3/2014 | Quan et al. |
| 2014/0087730 A1 | 3/2014 | Shitara |
| 2015/0003371 A1* | 1/2015 | Park ..................... H04W 52/365 370/329 |
| 2015/0043352 A1* | 2/2015 | Jang ....................... H04L 41/065 370/241 |
| 2015/0092541 A1* | 4/2015 | Yang ................ H04W 52/0216 370/230 |
| 2015/0092542 A1* | 4/2015 | Yang ..................... H04W 76/28 370/230 |
| 2015/0327116 A1* | 11/2015 | Zhang ............... H04W 72/1284 370/329 |
| 2016/0044737 A1* | 2/2016 | Kwon .................. H04W 76/14 370/328 |
| 2016/0135217 A1* | 5/2016 | Lee ......................... H04L 47/30 370/329 |
| 2017/0374579 A1* | 12/2017 | Wang ................ H04W 28/0278 |
| 2017/0374674 A1* | 12/2017 | Lee ...................... H04W 52/365 |
| 2018/0167842 A1* | 6/2018 | Bergstrom ............ H04W 28/10 |

FOREIGN PATENT DOCUMENTS

| | | |
|---|---|---|
| CN | 102761967 A | 10/2012 |
| CN | 106031224 A | 10/2016 |
| EP | 2293637 A1 | 3/2011 |
| EP | 1920558 B1 | 6/2012 |
| WO | 2016182344 A1 | 11/2016 |

* cited by examiner

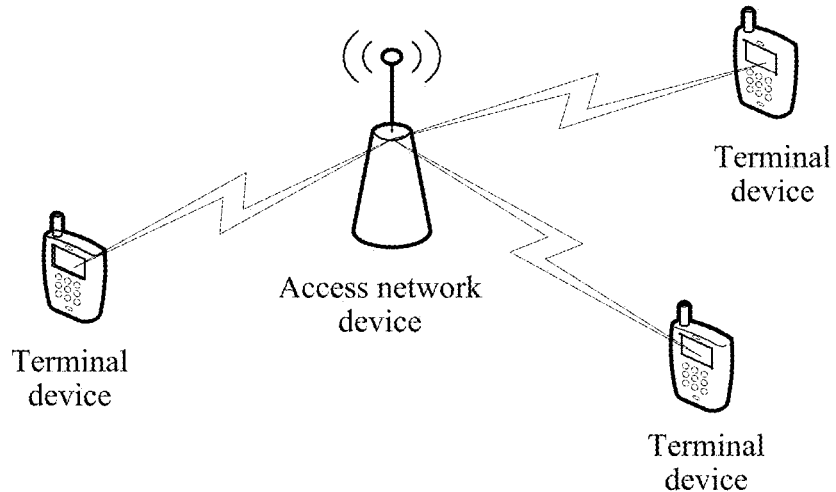

FIG. 1

A terminal device determines, from at least one radio interface technology, a first radio interface technology used to send first information, where each radio interface technology corresponds to an uplink resource, and the first information includes a size of to-be-sent data onf at least one logical channel of the terminal device — S101

The terminal device determines, based on the first information and attribute information of the first radio interface technology, whether to cancel the first information that is in a triggered state, where the attribute information of the first radio interface technology includes a priority of the first radio interface technology or an uplink resource corresponding to the first radio interface technology — S102

FIG. 2

S301 — A terminal device determines a logical channel set corresponding to second information including first information S302 — If a priority of a sixth radio interface technology corresponding to a third logical channel in the logical channel set is higher than a priority of a first radio interface technology, and an acknowledgement response returned by a radio access network device for the first information is received after the second information is sent by using the first radio interface technology, the terminal device cancels first information triggered by the third logical channel before the second information is packetized, where the sixth radio interface technology is a radio interface technology with a lowest priority in radio interface technologies corresponding to the third logical channel S303 — If a priority of a seventh radio interface technology corresponding to any logical channel in a logical channel set in which a third logical channel in the logical channel set is located is higher than a priority of a first radio interface technology, and an acknowledgement response returned by a radio access network device for the first information is received after the second information is sent by using the first radio interface technology, the terminal device cancels first information triggered by the third logical channel before the second information is packetized, where the seventh radio interface technology is a radio interface technology with a lowest priority in radio interface technologies corresponding to any logical channel in the logical channel group in which the third logical channel is located S304 — If a priority of an eighth radio interface technology corresponding to any logical channel in a radio interface technology corresponding to a third logical channel in the logical channel set is higher than a priority of a first radio interface technology, and an acknowledgement response returned by a radio access network device for the first information is received after the second information is sent by using the first radio interface technology, the terminal device cancels first information triggered by the third logical channel before the second information is packetized, where the eighth radio interface technology is a radio interface technology with a lowest priority in radio interface technologies corresponding to any logical channel in the radio interface technology corresponding to the third logical channel S305 — If a priority of a ninth radio interface technology corresponding to any logical channel with to-be-sent data in the logical channel set is higher than a priority of a first radio interface technology, and an acknowledgement response returned by a radio access network device for the first information is received after the second information is sent by using the first radio interface technology, the terminal device cancels first information triggered by a third logical channel before the second information is packetized, where the ninth radio interface technology is a radio interface technology with a lowest priority in radio interface technologies corresponding to any logical channel with to-be-sent data in the logical channel set

FIG. 4

INFORMATION PROCESSING METHOD AND DEVICE

CROSS-REFERENCE TO RELATED APPLICATIONS

This application is a continuation of International Application No. PCT/CN2018/080150, filed on Mar. 23, 2018, which claims priority to Chinese Patent Application No. 201710184659.0, filed on Mar. 24, 2017, the disclosures of which are incorporated herein by reference in their entireties.

TECHNICAL FIELD

This application relates to communications technologies, and in particular, to an information processing method and device.

BACKGROUND

A radio interface technology (RIT) is generally referred to as an air interface format, and is implemented by using a numerology parameter. The air interface format is a radio configuration of a terminal device during communication. For example, in a long term evolution (LTE) system or even a 5th generation mobile communications system, the RIT may include a subcarrier spacing, a cyclic prefix length, a multiple access manner, a modulation and coding scheme (MCS), a frame structure, radio resource control (RRC), and the like. Different radio interface technologies may meet different bandwidth and delay requirements of different services, and may be configured for a same terminal in a frequency division or time division manner. For example, it is assumed that there is currently a resource of 100 MHz bandwidth, the resource of 100 MHz bandwidth is divided into two resources of 50 MHz bandwidth, a spacing of subcarriers on which the terminal device transmits data in first 50 MHz bandwidth is configured as 15 kHz, and a spacing of subcarriers on which the terminal device transmits data in second 50 MHz bandwidth is configured as 30 kHz. In other words, two different radio interface technologies are configured for the current terminal device.

In the LTE system, before a base station allocates an uplink resource to user equipment (UE) by using an uplink scheduling grant, the UE may notify the base station of a volume of to-be-sent data in a buffer of a logical channel of the UE by using a buffer status report (BSR). When a plurality of radio interface technologies are configured for the UE, BSR processing may be: When a logical channel triggers a BSR, the UE randomly selects a radio interface technology in which there is an uplink resource, adds the BSR to a buffer status report media access control protocol data unit (BSR MAC PDU) or BSR MAC control element (BSR MAC CE), and sends the BSR MAC PDU or the BSR MAC CE to the base station by using the radio interface technology, so that the base station can obtain buffer information of the logical channel of the UE in a timely manner. In the method, when the BSR is added to the MAC PDU or a BSR MAC CE (in other words, when the BSR is packetized), the UE immediately cancels the BSR that is currently in a triggered state.

However, when the radio interface technology selected by the UE to send the BSR is a radio interface technology with a relatively low priority (in other words, a radio interface technology with a relatively long transmission time interval), there is usually a possibility that the BSR is not successfully sent, and such a manner in which the BSR that is in the triggered state is canceled once the BSR is added to the MAC PDU causes a large BSR retransmission delay and a large data sending delay.

SUMMARY

This application provides an information processing method and device, to resolve a technical problem that a large BSR retransmission delay and a large data sending delay are usually caused by BSR cancellation.

According to a first aspect, an information processing method, including:

determining, by a terminal device from at least one radio interface technology, a first radio interface technology used to send first information, where each of the at least one radio interface technology corresponds to an uplink resource, and the first information includes a size of to-be-sent data of at least one logical channel of the terminal device; and determining, by the terminal device based on the first information and attribute information of the first radio interface technology, whether to cancel the first information that is in a triggered state, where the attribute information of the first radio interface technology includes a priority of the first radio interface technology or an uplink resource corresponding to the first radio interface technology.

According to the information processing method provided in the first aspect, the terminal device determines, from the at least one radio interface technology in which there is an uplink resource, the first radio interface technology used to send the first information, and then determines, based on the first information and the attribute information of the first radio interface technology, whether to cancel the first information that is in the triggered state, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

In one embodiment, the first radio interface technology is a radio interface technology with a highest priority in the at least one radio interface technology.

In one embodiment, the determining, by the terminal device based on the first information and attribute information of the first radio interface technology, whether to cancel the first information that is in a triggered state specifically includes:

if a maximum transmission data volume of the uplink resource corresponding to each of the at least one radio interface technology is greater than or equal to a size of to-be-sent data on a logical channel corresponding to each radio interface technology, and a maximum transmission data volume of a remaining resource in the first radio interface technology is less than a size of second information including the first information, canceling, by the terminal device, all first information that is in the triggered state, where the remaining resource in the first radio interface technology is a resource excluding the uplink resource in the first radio interface technology occupied by to-be-sent data on a logical channel, the logical channel corresponding to the first radio interface technology.

In one embodiment, the determining, by the terminal device based on the first information and attribute information of the first radio interface technology, whether to cancel the first information that is in a triggered state specifically includes:

if a maximum transmission data volume of an uplink resource corresponding to any one of the at least one radio interface technology is greater than or equal to a size of to-be-sent data on any first logical channel corresponding to the any radio interface technology, and a maximum transmission data volume of a remaining resource in the first radio interface technology is less than a size of first information triggered by the first logical channel, canceling, by the terminal device, the first information triggered by the first logical channel; or if a size of to-be-sent data on each logical channel in a logical channel group in which the first logical channel is located is less than or equal to a maximum transmission data volume of an uplink resource in a radio interface technology corresponding to each logical channel in the logical channel group, and a maximum transmission data volume of a remaining resource in the first radio interface technology is less than a size of first information triggered by the first logical channel, canceling, by the terminal device, the first information triggered by the first logical channel; or if a size of to-be-sent data on each logical channel in a radio interface technology corresponding to the first logical channel is less than or equal to a maximum transmission data volume of an uplink resource in a radio interface technology corresponding to each logical channel in the radio interface technology corresponding to the first logical channel, and a maximum transmission data volume of a remaining resource in the first radio interface technology is less than a size of first information triggered by the first logical channel, canceling, by the terminal device, the first information triggered by the first logical channel, where the remaining resource in the first radio interface technology is a resource excluding the uplink resource in the first radio interface technology occupied by first information triggered by another logical channel and to-be-sent data on a logical channel, the logical channel corresponding to the first radio interface technology.

According to the method provided in the embodiments, the terminal device determines, from the at least one radio interface technology in which there is an uplink resource, the first radio interface technology used to send the first information, and then determines, based on the first information and the maximum transmission data volume of the uplink resource in the first radio interface technology, whether to cancel the first information that is in the triggered state, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

In one embodiment, the determining, by the terminal device based on the first information and attribute information of the first radio interface technology, whether to cancel the first information that is in a triggered state specifically includes:

determining, by the terminal device, a logical channel set corresponding to second information including the first information; and if a priority of a second radio interface technology corresponding to a second logical channel in the logical channel set is not higher than the priority of the first radio interface technology, canceling, by the terminal device, first information triggered by the second logical channel, where the second radio interface technology is a radio interface technology with a lowest priority in radio interface technologies corresponding to the second logical channel; or if a priority of a third radio interface technology corresponding to each logical channel in a logical channel group corresponding to the second logical channel is not higher than the priority of the first radio interface technology, canceling, by the terminal device, first information triggered by the second logical channel, where the third radio interface technology corresponding to each logical channel is a radio interface technology with a lowest priority in radio interface technologies corresponding to each logical channel in the logical channel group corresponding to the second logical channel; or if a priority of a fourth radio interface technology corresponding to each logical channel in a radio interface technology corresponding to the second logical channel is not higher than the priority of the first radio interface technology, canceling, by the terminal device, first information triggered by the second logical channel, where the fourth radio interface technology corresponding to each logical channel is a radio interface technology with a lowest priority in radio interface technologies corresponding to each logical channel in the radio interface technology corresponding to the second logical channel; or if a priority of a fifth radio interface technology corresponding to each logical channel with to-be-sent data in the logical channel set is not higher than the priority of the first radio interface technology, canceling, by the terminal device, first information triggered by the second logical channel, where the fifth radio interface technology corresponding to each logical channel with to-be-sent data is a radio interface technology with a lowest priority in radio interface technologies corresponding to each logical channel with to-be-sent data in the logical channel set.

According to the information processing method provided in one embodiment, the terminal device determines, from the at least one radio interface technology in which there is an uplink resource, the first radio interface technology used to send the first information, and then determines, based on the first information and the priority of the first radio interface technology, whether to cancel the first information that is in the triggered state, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

In one embodiment, the determining, by the terminal device based on the first information and attribute information of the first radio interface technology, whether to cancel the first information that is in a triggered state specifically includes:

determining, by the terminal device, a logical channel set corresponding to second information including the first information; and if a priority of a sixth radio interface technology corresponding to a third logical channel in the logical channel set is higher than the priority of the first radio interface technology, and an acknowledgement response returned by the radio access network device for the first information is received after the second information is sent by using the first radio interface technology, canceling, by the terminal device, first information triggered by the third logical channel before the second information is packetized, where the sixth radio interface technology is a radio interface technology with a lowest priority in radio interface technologies corresponding to the third logical channel; or if a priority of a seventh radio interface technology corresponding to any logical channel in a logical channel group in which a third logical channel in the logical channel set is located is higher than the priority of the first radio interface technology, and an acknowledgement response returned by the radio access network device for the first information is received after the second information is sent by using the first radio interface technology, canceling, by the terminal device, first information triggered by the third logical channel before the second information is packetized, where the seventh radio interface technology is a radio interface technology with a lowest priority in radio interface technologies corresponding to any logical channel in the logical channel group in which the third logical channel is located; or if a priority of an eighth radio interface technology corresponding to any logical channel in a radio interface technology corresponding to a third logical channel in the logical channel set is higher than the priority of the first radio interface technology, and an acknowledgement response returned by the radio access network device for the first information is received after the second information is sent by using the first radio interface technology, canceling, by the terminal device, first information triggered by the third logical channel before the second information is packetized, where the eighth radio interface technology is a radio interface technology with a lowest priority in radio interface technologies corresponding to any logical channel in the radio interface technology corresponding to the third logical channel; or if a priority of a ninth radio interface technology corresponding to any logical channel with to-be-sent data in the logical channel set is higher than the priority of the first radio interface technology, and an acknowledgement response returned by the radio access network device for the first information is received after the second information is sent by using the first radio interface technology, canceling, by the terminal device, first information triggered by the third logical channel before the second information is packetized, where the ninth radio interface technology is a radio interface technology with a lowest priority in radio interface technologies corresponding to any logical channel with to-be-sent data in the logical channel set.

According to the information processing method in one embodiment, the terminal device determines, from the at least one radio interface technology in which there is an uplink resource, the first radio interface technology used to send the first information, and then determines, based on the first information, the priority of the first radio interface technology, and whether an acknowledgement response returned by the radio access network device is received, whether to cancel the first information that is in the triggered state, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

In one embodiment, the determining, by the terminal device based on the first information and attribute information of the first radio interface technology, whether to cancel the first information that is in a triggered state specifically includes:

determining, by the terminal device, a logical channel set corresponding to second information including the first information; and if data of a fourth logical channel in the logical channel set expires, canceling, by the terminal device, first information triggered by the fourth logical channel; or if data of all fifth logical channels in a logical channel group corresponding to the fourth logical channel expires, canceling, by the terminal device, first information triggered by the fourth logical channel before the second information is packetized, where a priority of a radio interface technology that corresponds to the fifth logical channels and that has a lowest priority is higher than the priority of the first radio interface technology; or if data of all logical channels in a logical channel group corresponding to the fourth logical channel expires, canceling, by the terminal device, first information triggered by the fourth logical channel; or if data of all sixth logical channels in all logical channels in a radio interface technology corresponding to the fourth logical channel expires, canceling, by the terminal device, first information triggered by the fourth logical channel before the second information is packetized, where a priority of a radio interface technology that corresponds to the sixth logical channels and that has a lowest priority is higher than the priority of the first radio interface technology; or if data of all logical channels in a radio interface technology corresponding to the fourth logical channel expires, canceling, by the terminal device, first information triggered by the fourth logical channel; or if data of all seventh logical channels in all logical channels with to-be-sent data in the logical channel set expires, canceling, by the terminal device, first information triggered by the fourth logical channel before the second information is packetized, where a priority of a radio interface technology that corresponds to the seventh logical channels and that has a lowest priority is higher than the priority of the first radio interface technology; or if data of all logical channels with to-be-sent data expires, canceling, by the terminal device, first information triggered by the fourth logical channel.

According to the information processing method provided in one embodiment, the terminal device determines, from the at least one radio interface technology in which there is an uplink resource, the first radio interface technology used to send the first information, and then determines, based on whether the data on the logical channel in the logical channel set corresponding to the second information including the first information expires and the priority of the first radio interface technology, whether to cancel the first information that is in the triggered state, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

In one embodiment, the method further includes:

obtaining, by the terminal device, a logical channel that triggers the first information;

determining, by the terminal device as a tenth radio interface technology, a radio interface technology with a lowest priority in radio interface technologies corresponding to the logical channel that triggers the first information; and if the priority of the first radio interface technology is lower than a priority of the tenth radio interface technology, sending, by the terminal device, request signaling to the radio access network device, where the request signaling is used to request to obtain an uplink resource corresponding to an eleventh radio interface technology from the radio access network device, and a priority of the eleventh radio interface technology is not lower than the priority of the tenth radio interface technology.

According to the information processing method provided in one embodiment, when the priority of the first radio interface technology is lower than the priority of the tenth radio interface technology that has a lowest priority and that corresponds to the logical channel that triggers the first information in the second information, the terminal device sends the request signaling to the radio access network device, to obtain the uplink resource in the eleventh radio interface technology whose priority is higher than the priority of the tenth radio interface technology, with no need to keep waiting for a resource in the eleventh radio interface technology to send the second information. Therefore, sending efficiency of the second information is improved, and a data sending delay of the terminal device is reduced.

In one embodiment, the method further includes:

obtaining, by the terminal device, a first logical channel group corresponding to a logical channel that triggers the first information;

determining, by the terminal device, radio interface technologies that correspond to all logical channels in the first logical channel group and that have lowest priorities, and determining, as a twelfth radio interface technology, a radio interface technology with a highest priority in the radio interface technologies that correspond to all logical channels in the first logical channel group and that have lowest priorities; and if the priority of the first radio interface technology is lower than a priority of the twelfth radio interface technology, sending, by the terminal device, request signaling to the radio access network device, where the request signaling is used to request to obtain an uplink resource corresponding to a thirteenth radio interface technology from the radio access network device, and a priority of the thirteenth radio interface technology is not lower than the priority of the twelfth radio interface technology.

According to the information processing method provided in one embodiment, when the priority of the first radio interface technology is lower than the priority of the twelfth radio interface technology that meets the delay requirement of the first logical channel group in which the logical channel that triggers the first information is located, the terminal device sends the request signaling to the radio access network device, to obtain the uplink resource in the thirteenth radio interface technology whose priority is higher than the priority of the twelfth radio interface technology, with no need to keep waiting for a resource in the thirteenth radio interface technology to send the second information. Therefore, sending efficiency of the second information is improved, and a data sending delay of the terminal device is reduced.

In one embodiment, the method further includes:

obtaining, by the terminal device, a fourteenth radio interface technology corresponding to a logical channel that triggers the first information;

determining, by the terminal device, radio interface technologies that correspond to all logical channels in the fourteenth radio interface technology and that have lowest priorities, and determining, as a fifteenth radio interface technology, a radio interface technology with a highest priority in the radio interface technologies that correspond to all logical channels in the fourteenth radio interface technology and that have lowest priorities; and if the priority of the first radio interface technology is lower than a priority of the fifteenth radio interface technology, sending, by the terminal device, request signaling to the radio access network device, where the request signaling is used to request to obtain an uplink resource corresponding to a sixteenth radio interface technology from the radio access network device, and a priority of the sixteenth radio interface technology is not lower than the priority of the fifteenth radio interface technology.

According to the information processing method provided in one embodiment, when the priority of the first radio interface technology is lower than the priority of the fifteenth radio interface technology that meets the delay requirement of the logical channel in the fourteenth radio interface technology corresponding to the logical channel that triggers the first information, the terminal device sends the request signaling to the radio access network device, to obtain the uplink resource in the sixteenth radio interface technology whose priority is higher than the priority of the fifteenth radio interface technology, with no need to keep waiting for a resource in the fifteenth radio interface technology to send the second information. Therefore, sending efficiency of the second information is improved, and a data sending delay of the terminal device is reduced.

In one embodiment, the method further includes:

determining, by the terminal device, radio interface technologies that correspond to all logical channels of the terminal device and that have lowest priorities, and determining, as a seventeenth radio interface technology, a radio interface technology with a highest priority in the radio interface technologies that correspond to all logical channels of the terminal device and that have lowest priorities; and if the priority of the first radio interface technology is lower than a priority of the seventeenth radio interface technology, sending, by the terminal device, request signaling to the radio access network device, where the request signaling is used to request to obtain an uplink resource corresponding to an eighteenth radio interface technology from the radio access network device, and a priority of the eighteenth radio interface technology is not lower than the priority of the seventeenth radio interface technology.

According to the information processing method provided in one embodiment, when the priority of the first radio interface technology is lower than the priority of the seventeenth radio interface technology that meets the delay requirement of each logical channel of the terminal device, the terminal device sends the request signaling to the radio access network device, to obtain the uplink resource in the eighteenth radio interface technology whose priority is higher than the priority of the seventeenth radio interface technology, with no need to keep waiting for a resource in the eighteenth radio interface technology to send the second information. Therefore, sending efficiency of the second information is improved, and a data sending delay of the terminal device is reduced.

In one embodiment, the method further includes:

if the first information is canceled, canceling, by the terminal device, request signaling triggered by the first information.

In one embodiment, the first information is a buffer status report BSR, and second information including the first information is a buffer status report media access control control element (BSR MAC CE); and the BSR MAC CE includes an identifier of a logical channel that triggers the BSR and a size of to-be-sent data on the logical channel that triggers the BSR, and the BSR is used to indicate, to the radio access network device, a size of to-be-sent data on a logical channel that triggers the first information; or the BSR MAC CE includes an identifier of any logical channel in a first logical channel group in which a logical channel that triggers the BSR is located and a size of to-be-sent data of the any logical channel; or the BSR MAC CE includes an identifier of any logical channel in a radio interface technology corresponding to a logical channel that triggers the BSR and a size of to-be-sent data of the any logical channel; or the BSR MAC CE includes an identifier of any logical channel of the terminal device and a size of to-be-sent data of the any logical channel.

In one embodiment, the first information is a buffer status report BSR, and second information including the first information is a buffer status report media access control control element (BSR MAC CE); and the BSR MAC CE includes an identifier of at least one logical channel in a first logical channel group in which a logical channel that triggers the BSR is located and a size of to-be-sent data of the at least one logical channel; or the BSR MAC CE includes a group identifier of at least one logical channel group in a radio interface technology corresponding to a logical channel that triggers the BSR and a size of to-be-sent data of the at least one logical channel group; or the BSR MAC CE includes an identifier of at least one logical channel in all logical channels of the terminal device and a size of to-be-sent data of the at least one logical channel; or the BSR MAC CE includes an identifier of at least one logical channel group in all logical channel groups of the terminal device and a size of to-be-sent data of the at least one logical channel group.

According to a second aspect, to implement the information processing method in the first aspect, one embodiment provides a terminal device, and the terminal device has a function of implementing the information processing method. The function may be implemented by hardware, or may be implemented by hardware executing corresponding software. The hardware or the software includes one or more modules corresponding to the foregoing function.

In one embodiment of the second aspect, the terminal device includes a plurality of function modules or units, configured to implement any information processing method in the first aspect.

In another embodiment of the second aspect, a structure of the terminal device may include a processor, a receiver, and a transmitter (or a transceiver). The processor is configured to support the terminal device in performing a corresponding function in any information processing method in the first aspect. The transceiver is configured to support communication between the terminal device and another network device or terminal device, and may be, for example, a corresponding radio frequency module or baseband module. The terminal device may further include a memory. The memory is configured to be coupled to the processor, and store a program instruction and data that are required by the terminal device to perform the information processing method.

According to a third aspect, an embodiment of this application provides a computer storage medium, configured to store a computer software instruction used by the foregoing terminal device. The computer storage medium includes a program designed for executing the first aspect.

According to a fourth aspect, an embodiment of this application provides a computer program product, including an instruction. When the computer program is executed by a computer, the instruction enables the computer to perform a function performed by the terminal device in the foregoing method.

According to the information processing method provided in this application, the terminal device determines, from the at least one radio interface technology in which there is an uplink resource, the first radio interface technology used to send the first information, and then determines, based on the first information and the attribute information of the first radio interface technology, whether to cancel the first information that is in the triggered state, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

DESCRIPTION OF DRAWINGS

FIG. 1 is a structural diagram of a network according to an embodiment of this application;

FIG. 2 is a flowchart of Embodiment 1 of an information transmission method according to this application;

FIG. 4 is a flowchart of another embodiment of an information processing method according to this application;

DESCRIPTION OF EMBODIMENTS

Figure 3:
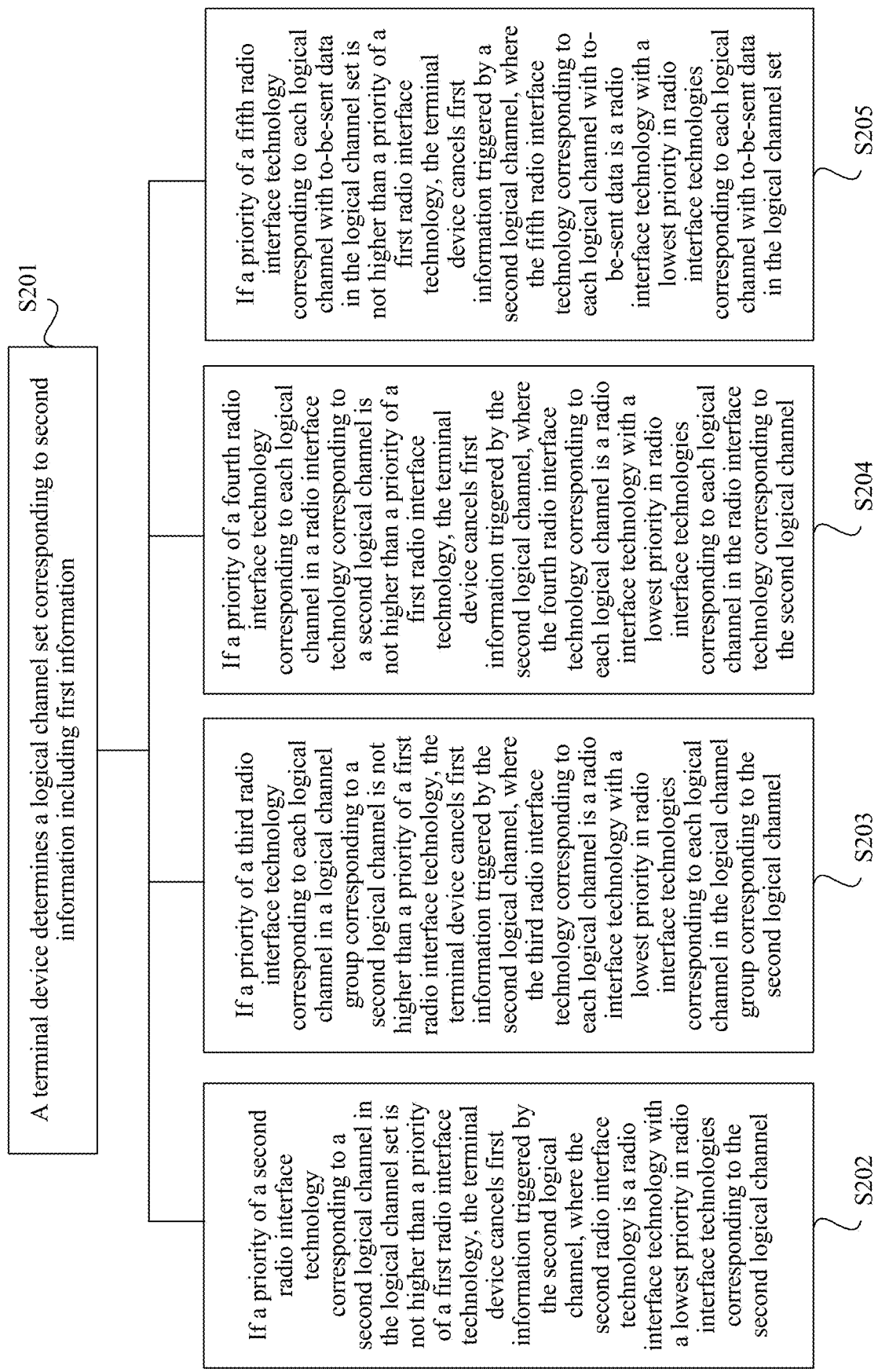
FIG. 3 is a flowchart of another embodiment of an information transmission method according to this application.

An information processing method and device provided in this application are applicable to a network system shown in FIG. 1 (FIG. 1 is a structural diagram of a network according to an embodiment of this application). As shown in FIG. 1, the network system includes at least one radio access network device and a terminal device, and the terminal device is in a coverage area of at least one cell (or carrier) provided by the radio access network device. When the terminal device is in coverage areas of at least two cells (or carriers) provided by the radio access network device, in other words, when a plurality of cells serve the terminal device, the terminal device may work in a carrier aggregation (CA) or dual cell (DC) or coordinated point transmission/reception (CoMP) manner. The at least one cell provides at least one radio interface technology and provides a radio resource for the terminal device.

To better describe technical solutions in this application, the following explains some terms in this application to facilitate understanding of a person skilled in the art.

(1) Radio Interface Technology

The radio interface technology (RIT) in this application may be referred to as an air interface format, and is implemented by using a configuration of a numerology parameter. The radio interface technology is a radio configuration of a terminal device during communication. For example, in a long term evolution (LTE) system or even a 5th generation mobile communications system, the RIT may include a subcarrier spacing, a cyclic prefix length, a multiple access manner, a modulation and coding scheme (MCS), a frame structure, radio resource control (RRC), and the like. Different radio interface technologies may meet different bandwidth and delay requirements of different services, and may be configured for a same terminal device in a frequency division or time division manner. For example, it is assumed that there is currently a resource of 100 MHz bandwidth, the resource of 100 MHz bandwidth is divided into two resources of 50 MHz bandwidth, a spacing of subcarriers on which the terminal device transmits data in first 50 MHz bandwidth is configured as 15 kHz, and a spacing of subcarriers on which the terminal device transmits data in second 50 MHz bandwidth is configured as 30 kHz. In other words, two different radio interface technologies are configured for the current terminal device.

For the radio interface technologies of the terminal device, at a moment, there is a case in which an uplink resource exists in some radio interface technologies and no uplink resource exists in some other radio interface technologies.

(2) Relationship Between a Logical Channel of a Terminal Device and a Radio Interface Technology of the Terminal Device The terminal device has a plurality of logical channels, and the logical channel may be understood as a radio bearer or a radio channel used for transmission of radio data. These logical channels may be divided into one or more logical channel groups, and each logical channel group includes one or more logical channels. Different logical channels may correspond to a same radio interface technology, or may correspond to different radio interface technologies. From another dimension, a radio interface technology corresponding to a logical channel may correspond to a plurality of logical channels. For example, a logical channel 1 corresponds to a radio interface technology 1, and a logical channel 2 corresponds to the radio interface technology 1 and a radio interface technology 2. In this case, the radio interface technology 1 corresponding to the logical channel 1 corresponds to two logical channels, which are respectively the logical channel 1 and the logical channel 2.

In addition, one logical channel may correspond to one or more radio interface technologies.

(3) Priority of a Radio Interface Technology

In this application, transmission time intervals of different radio interface technologies are different, and a priority of a radio interface technology with a short transmission time interval is higher than a priority of a radio interface technology with a long transmission time interval.

(4) Terminal Device

The terminal device in this application may be user equipment (UE), which is a device that provides voice and/or data connectivity for a user, for example, a handheld device with a wireless connection function, or a vehicle-mounted device. In one embodiment, the device may be a handheld device with a wireless connection function, or another processing device connected to a wireless modem. In addition, the wireless terminal may communicate with one or more core networks by using a radio access network (RAN). For example, the wireless terminal may be specifically a mobile terminal, such as a mobile phone (also referred to as a "cellular" phone) and a computer with a mobile terminal. The computer with a mobile terminal may be a portable, pocket-sized, handheld, computer built-in, or vehicle-mounted mobile apparatus, which may exchange voice and/or data with the core networks.

(5) Radio Access Network Device

The radio access network device in embodiments of this application may be a device that is in an access network and that communicates with a wireless terminal over an air interface by using at least one sector. In one embodiment, the radio access network device may be configured to perform conversion between a received over-the-air frame and an IP packet and serve as a router between the wireless terminal and a rest portion of the access network, where the rest portion of the access network may include an Internet Protocol (IP) network. In one embodiment, the radio access network device may further coordinate attribute management for an air interface. In one embodiment, the radio access network device may be a base station, and the base station may be a NodeB in WCDMA, or may be an evolved NodeB (eNodeB) in LTE, or may be a transmission reception point (TRP) in 5G, and is not limited in this application.

It may be understood that, "at least one" in the embodiments of this application means "one" or "more than one".

In addition, this application is applicable to not only a 5G system but also a wireless communications system such as a universal mobile telecommunications system (UMTS) system, a CDMA system, a wireless local area network (WLAN), etc.

In previous designs, when a logical channel triggers a BSR, the UE randomly selects a radio interface technology in which there is an uplink resource, adds the BSR to a BSR MAC PDU, and sends the BSR MAC PDU to the base station by using the radio interface technology, so that the base station can obtain buffer information of the logical channel of the UE in a timely manner. When the BSR is added to the MAC PDU or a BSR MAC CE (the BSR MAC PDU includes the BSR MAC CE), the UE immediately cancels the BSR that is currently in a triggered state. However, when the radio interface technology selected by the UE to send the BSR is a radio interface technology with a relatively low priority, there is usually a possibility that the BSR is not successfully sent, and canceling the BSR before the BSR is successfully sent causes a large BSR retransmission delay and a large data sending delay.

The information processing method in the embodiments of this application aims to resolve the foregoing technical problem.

The following uses specific embodiments to describe in detail the technical solutions in this application and how the foregoing technical problem is resolved in the technical solutions in this application. The following several specific embodiments may be combined with each other, and a same or similar concept or process may not be described repeatedly in some embodiments.

FIG. 2 is a flowchart of Embodiment 1 of an information processing method according to this application. This embodiment relates to a specific process in which a terminal device determines, based on an attribute of a radio interface technology, whether to cancel first information that is in a triggered state. In one embodiment, in this embodiment, the first information may be a BSR or other information that has a same function as a BSR, and the first information may indicate a size of to-be-sent data of at least one logical channel of the current terminal device to a radio access network device. As shown in FIG. 2, the method specifically includes the following operations.

Operation S101: The terminal device determines, from at least one radio interface technology, a first radio interface technology used to send the first information, where each radio interface technology corresponds to an uplink resource, and the first information includes the size of the to-be-sent data of the at least one logical channel of the terminal device.

In one embodiment, as described in the foregoing term explanation, the terminal device may correspond to one or more radio interface technologies, and there is also a case in which a resource exists in some radio interface technologies and no resource exists in remaining radio interface technologies. The "at least one radio interface technology" in this application is a radio interface technology in which there is an uplink resource. The uplink resource is an uplink resource configured by the radio access network device to transmit data.

Generally, that the first information in the triggered state is generated on the terminal device may be that when data arrives on one or more logical channels, the logical channel triggers the first information. The first information may include only a size of to-be-sent data on the logical channel that triggers the first information, or may include not only a size of to-be-sent data on the logical channel that triggers the first information but also a size of to-be-sent data of another logical channel. This is not limited in this embodiment of this application. In one embodiment, that the first information in the triggered state is generated on the terminal device may be alternatively that there is no data in buffers of all logical channels of the terminal device, and in this case, the terminal device triggers the first information when new data arrives on any logical channel. In one embodiment, that the first information in the triggered state is generated on the terminal device may be alternatively that data already exists in buffers of some logical channels of the terminal device, and the first information is triggered when new data arrives on a logical channel that has a higher priority and whose buffer has no data. In one embodiment, that the first information in the triggered state is generated on the terminal device may be alternatively that when a retxBSR-Timer expires, the first information is also triggered, provided that there is data on any logical channel. In one embodiment, that the first information in the triggered state is generated on the terminal device may be alternatively that even if there is data in a buffer of another logical channel, the first information may also be triggered when new data arrives on any logical channel on which there is no data. This application imposes no limitation on a manner of generating or triggering the first information. It should be noted that the retxBSR-Timer is a BSR retransmission timer. For example, after sending a BSR, the terminal device waits to receive uplink grant information (UL grant) sent by the radio access network device. If the terminal device receives no UL grant within the retxBSR-Timer, the terminal device believes that the access network device may not receive the BSR sent by the terminal device. In this case, the terminal device sends a BSR again to notify the access network device that the terminal device has to-be-sent data, so as to request the access network device to configure a UL grant for the terminal device. In one embodiment, the UL grant includes allocation information of an uplink resource required by the terminal to send data.

In one embodiment, there may be one or more pieces of first information. When there are a plurality of pieces of first information, the first information may be triggered by different logical channels.

When the terminal device determines that first information exists on the terminal device, the terminal device selects a first radio interface technology from radio interface technologies in which there is an uplink resource, and sends the first information that currently exists on the terminal device. In one embodiment, the first radio interface technology may be a radio interface technology randomly selected by the terminal device from the radio interface technologies in which there is an uplink resource, or may be a radio interface technology with a highest priority in the radio interface technologies in which there is an uplink resource. It should be noted that, when the first information is added to a BSR MAC CE or a MAC PDU at a MAC layer, the first information is still in the triggered state.

Operation S102: The terminal device determines, based on the first information and attribute information of the first radio interface technology, whether to cancel the first information that is in the triggered state, where the attribute information of the first radio interface technology includes a priority of the first radio interface technology or an uplink resource corresponding to the first radio interface technology.

In one embodiment, after the terminal device uses the first radio interface technology to send the first information, the terminal device determines, based on a logical channel corresponding to to-be-sent data included in the first information and the attribute information of the first radio interface technology, whether to cancel the first information that is still in the triggered state. In one embodiment, the attribute information of the first radio interface technology may be the priority of the first radio interface technology, and the terminal device may determine, based on the priority of the first radio interface technology and a delay requirement of the logical channel of the to-be-sent data included in the first information, whether the first radio interface technology meets a delay requirement of one or more of these logical channels, to determine whether to cancel the first information. For example, when delay requirements of these logical channels are met, the first information in the triggered state may be canceled; or when delay requirements of these logical channels are not met, the first information in the triggered state may not be canceled. In one embodiment, the attribute information of the first radio interface technology may be the uplink resource corresponding to the first radio interface technology, and the terminal device may compare a maximum transmission data volume of the uplink resource corresponding to the first radio interface technology with the size of the to-be-sent data indicated in the first information and a size of the first information, and determine, based on a comparison result, whether to cancel the first information that is in the triggered state. It should be noted that the "size of the first information" in this application is a quantity of bits of the first information or a volume of data used to transmit the first information.

It may be learned from the foregoing description that, when the terminal device adds the first information to the MAC CE or the MAC PDU, the terminal device no longer blindly uses a manner in which "the first information in the triggered state is canceled once being packetized", but determines, based on the first information and the attribute information of the first radio interface technology used to send the first information, whether to cancel the first information, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

In one embodiment, the terminal device may use the first radio interface technology to directly send the first information or to send second information including the first information. In one embodiment, the first information may be a BSR, and the second information may be a BSR MAC CE.

In one embodiment, when the first radio interface technology is a radio interface technology with a highest priority in the at least one radio interface technology in which there is an uplink resource, reliability of the terminal device in successfully sending the first information is improved. Based on this case, the foregoing operation S102 may be omitted. This resolves a technical problem that a success rate of sending the first information is not high because a radio interface technology in which there is a resource is blindly selected to send the first information. In other words, operations S101 and S102 may be combined to serve as this embodiment of this application, or operation S101 may separately serve as an embodiment.

According to the information processing method provided in this application, the terminal device determines, from the at least one radio interface technology in which there is an uplink resource, the first radio interface technology used to send the first information, and then determines, based on the first information and the attribute information of the first radio interface technology, whether to cancel the first information that is in the triggered state, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

Based on the foregoing description of Embodiment 1, the following embodiments specifically describe a specific process in which the terminal device determines to cancel the first information. For ease of description, in the following embodiment or implementation, an example in which the first information is a BSR and the second information is a BSR MAC CE is used. Refer to the following description.

One embodiment relates to a specific process in which the terminal device determines, based on the first information and the uplink resource corresponding to the first radio interface technology, whether to cancel the first information that is in the triggered state. In other words, S102 may specifically include:

if a maximum transmission data volume of the uplink resource corresponding to each of the at least one radio interface technology is greater than or equal to a size of to-be-sent data on a logical channel corresponding to each radio interface technology, and a maximum transmission data volume of a remaining resource in the first radio interface technology is less than a size of second information including the first information, canceling, by the terminal device, all first information that is in the triggered state, where the remaining resource in the first radio interface technology is a resource excluding the uplink resource in the first radio interface technology occupied by to-be-sent data on a logical channel, the logical channel corresponding to the first radio interface technology.

In one embodiment, the terminal device may trigger one piece of first information or a plurality of pieces of first information, and the second information includes all first information triggered by the terminal device. In addition, in this embodiment, there is one piece of second information.

In one embodiment, the terminal device determines, based on two dimensions, whether to cancel the first information (namely, the BSR) that is in the triggered state, and the two dimensions are a maximum volume of data that can be transmitted (maximum transmission data volume for short) by the uplink resource in each radio interface technology and the maximum transmission data volume of the remaining resource in the first radio interface technology. In one embodiment, the remaining resource in the first radio interface technology is the resource excluding the uplink resource in the first radio interface technology occupied by the to-be-sent data on the logical channel, the logical channel corresponding to the first radio interface technology. When the terminal device determines that a maximum transmission data volume of an uplink resource in each radio interface technology in which there is an uplink resource used for new transmission is greater than or equal to a size of to-be-sent data on a logical channel corresponding to each radio interface technology, and the maximum transmission data volume of the remaining resource in the first radio interface technology is less than the size of the second information, the terminal device cancels all first information that is in the triggered state. In other words, when the uplink resource that is used for new transmission and that is in each radio interface technology of the terminal device can accommodate all to-be-sent data on the logical channel corresponding to the radio interface technology, but the remaining resource in the first radio interface technology cannot accommodate the second information, then the size of the to-be-sent data on the logical channel indicated in the first information in the second information is already 0 (the size of the to-be-sent data on the logical channel indicated in the first information is a size of remaining data after all to-be-sent data on the logical channel completely occupies an uplink resource in a radio interface technology corresponding to the logical channel). In other words, in this case, the second information indicates that no logical channel has remaining data, and therefore reporting the second information is meaningless. Therefore, all first information in the triggered state may be canceled.

To make the solution in this embodiment more comprehensible, a simple example is used herein for description.

It is assumed that the terminal device has four logical channels, which are respectively a logical channel 1, a logical channel 2, a logical channel 3, and a logical channel 4. The logical channel 1 corresponds to a radio interface technology 1, the logical channel 2 corresponds to a radio interface technology 2, the logical channel 3 corresponds to a radio interface technology 3, and the logical channel 4 corresponds to a radio interface technology 4. In each radio interface technology, there is an uplink resource used for new transmission. It is assumed that the first radio interface technology is the radio interface technology 1, an uplink resource in the radio interface technology 1 can accommodate all to-be-sent data on the logical channel 1, an uplink resource in the radio interface technology 2 can accommodate all to-be-sent data on the logical channel 2, an uplink resource in the radio interface technology 3 can accommodate all to-be-sent data on the logical channel 3, and an uplink resource in the radio interface technology 4 can accommodate all to-be-sent data on the logical channel 4. If each logical channel triggers one piece of first information, and each piece of first information includes only a size of to-be-sent data on a logical channel that triggers the first information, then sizes of to-be-sent data that are indicated in the four pieces of first information are all 0. The second information includes the first information separately triggered by the four logical channels.

In this case, after all to-be-sent data on the logical channel 1 is placed on the uplink resource corresponding to the first radio interface technology (namely, the radio interface technology 1), if there is a remaining resource, and a maximum transmission data volume of the remaining resource is less than the size of the second information, then because the size of the to-be-sent data indicated in the first information in the second information is 0, it indicates that sending the second information is unnecessary. Therefore, the terminal device may cancel all first information that is currently in the triggered state.

Another embodiment relates to another specific process in which the terminal device determines, based on the first information and the uplink resource corresponding to the first radio interface technology, whether to cancel the first information that is in the triggered state. In this embodiment, the first information includes only a size of to-be-sent data on a logical channel that triggers the first information. S102 may specifically include the following three embodiments, which are respectively:

In a first embodiment, if a maximum transmission data volume of an uplink resource corresponding to any one of the at least one radio interface technology is greater than or equal to a size of to-be-sent data on any first logical channel corresponding to the any radio interface technology, and a maximum transmission data volume of a remaining resource in the first radio interface technology is less than a size of first information triggered by the first logical channel, the terminal device cancels the first information triggered by the first logical channel. The remaining resource in the first radio interface technology is a resource excluding the uplink resource in the first radio interface technology occupied by first information triggered by another logical channel and to-be-sent data on a logical channel corresponding to the first radio interface technology.

In this embodiment, when the terminal device determines that a maximum volume of data that can be carried (maximum transmission data volume for short) by any one (it is assumed that the radio interface technology is A, logical channels in the radio interface technology A include a logical channel A and a logical channel B, a radio interface technology corresponding to the logical channel A is the radio interface technology A, and radio interface technologies corresponding to the logical channel B are the radio interface technology A and a radio interface technology B) of at least one radio interface technology in which there is an uplink resource for new transmission is greater than or equal to a size of all to-be-sent data of any first logical channel (assumed to be the logical channel A) corresponding to the radio interface technology A, and the maximum transmission data volume of the remaining resource in the first radio interface technology is less than a size of first information triggered by the logical channel, the terminal device may cancel the first information triggered by the logical channel A. In other words, when an uplink resource in the radio interface technology A can accommodate all to-be-sent data on the logical channel A, a size of to-be-sent data indicated in the first information triggered by the logical channel A is 0 (for a specific reason, refer to a previous implementation). In addition, after all to-be-sent data on the logical channel corresponding to the first radio interface technology is placed, if the remaining resource in the first radio interface technology used to send the first information cannot accommodate the first information triggered by the logical channel A, because performing indication by using the first information is actually meaningless, the terminal device may cancel the first information triggered by the logical channel A.

In a second embodiment, if a size of to-be-sent data on each logical channel in a logical channel group in which the first logical channel is located is less than or equal to a maximum transmission data volume of an uplink resource in a radio interface technology corresponding to each logical channel in the logical channel group, and a maximum transmission data volume of a remaining resource in the first radio interface technology is less than a size of first information triggered by the first logical channel, the terminal device cancels the first information triggered by the first logical channel. The remaining resource in the first radio interface technology is a resource excluding the uplink resource in the first radio interface technology occupied by first information triggered by another logical channel and to-be-sent data on a logical channel corresponding to the first radio interface technology.

In this embodiment, the example in the first embodiment continues to be used, and the first logical channel is the logical channel A corresponding to the radio interface technology A. It is assumed that a logical channel group P to which the logical channel A belongs includes the logical channel A, a logical channel C, and a logical channel D. It is assumed that a radio interface technology corresponding to the logical channel C is a radio interface technology C, and a radio interface technology corresponding to the logical channel D is a radio interface technology D.

When the terminal device determines that a size of to-be-sent data on the logical channel A in the logical channel group P is less than or equal to a maximum volume of data that can be transmitted (maximum transmission data volume for short) by the uplink resource in the radio interface technology A corresponding to the logical channel A, a size of to-be-sent data on the logical channel C in the logical channel group P is less than a maximum transmission data volume of an uplink resource in the radio interface technology C corresponding to the logical channel C, a size of to-be-sent data on the logical channel D in the logical channel group P is less than a maximum transmission data volume of an uplink resource in the radio interface technology D corresponding to the logical channel D, and after all to-be-sent data on the logical channel corresponding to the first radio interface technology is placed, a remaining resource of the uplink resource in the first radio interface technology used to send first information separately triggered by the logical channel A, the logical channel C, and the logical channel D cannot accommodate the first information triggered by the logical channel A, because performing indication by using the first information is actually meaningless, the terminal device may cancel the first information triggered by the logical channel A.

In a third embodiment, if a size of to-be-sent data on each logical channel in a radio interface technology corresponding to the first logical channel is less than or equal to a maximum transmission data volume of an uplink resource in a radio interface technology corresponding to each logical channel in the radio interface technology corresponding to the first logical channel, and a maximum transmission data volume of a remaining resource in the first radio interface technology is less than a size of first information triggered by the first logical channel, the terminal device cancels the first information triggered by the first logical channel, where the remaining resource in the first radio interface technology is a resource excluding the uplink resource in the first radio interface technology occupied by first information triggered by another logical channel and to-be-sent data on a logical channel corresponding to the first radio interface technology.

In this embodiment, the example in the first embodiment continues to be used, and the first logical channel is the logical channel A corresponding to the radio interface technology A. The logical channels in the radio interface technology A include the logical channel A and the logical channel B, the radio interface technology corresponding to the logical channel A is the radio interface technology A, and the radio interface technologies corresponding to the logical channel B are the radio interface technology A and the radio interface technology B.

When the terminal device determines that a size of to-be-sent data on the logical channel A in the radio interface technology A is less than or equal to a maximum volume of data that can be transmitted (maximum transmission data volume for short) by the uplink resource in the radio interface technology A corresponding to the logical channel A, a size of to-be-sent data on the logical channel B is less than or equal to a maximum transmission data volume that can be transmitted by uplink resources in the radio interface technology A and the radio interface technology B that are corresponding to the logical channel B, and after all to-be-sent data on the logical channel corresponding to the first radio interface technology is placed, a remaining resource of the uplink resource in the first radio interface technology used to send first information separately triggered by the logical channel A and the logical channel B cannot accommodate the first information triggered by the logical channel A, because performing indication by using the first information is actually meaningless, the terminal device may cancel the first information triggered by the logical channel A.

According to the information processing method provided in this application, the terminal device determines, from the at least one radio interface technology in which there is an uplink resource, the first radio interface technology used to send the first information, and then determines, based on the first information and the maximum transmission data volume of the uplink resource in the first radio interface technology, whether to cancel the first information that is in the triggered state, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

FIG. 3 is a flowchart of another embodiment of the information processing method according to this application. This embodiment relates to another specific process in which the terminal device determines, based on the first information and the priority of the first radio interface technology, whether to cancel the first information that is in the triggered state. In this embodiment, an example in which the first information is a BSR and the second information including the first information is a BSR MAC CE is used. The first information may include sizes of to-be-sent data of all logical channels, or may include only a size of to-be-sent data on a logical channel that triggers the first information, or may include sizes of to-be-sent data of some logical channels. This is not limited in this embodiment. The second information may include first information triggered by all logical channels, and there may be one piece of such second information. The second information may alternatively include only one piece of first information, and there may be a plurality of such second information. In addition, in this application, the first radio interface technology is a radio interface technology with a highest priority in the radio interface technologies that are of the terminal device and in which there is an uplink resource. Based on the foregoing embodiment, operation S102 may specifically include the following operations.

Operation S201: The terminal device determines a logical channel set corresponding to second information including the first information. Then, perform operations S202, S203, S204, or S205.

In this embodiment, operations S202, S203, S204, and S205 are four parallel embodiments. After the terminal device packetizes the first information into the second information, the terminal device determines the logical channel set corresponding to the second information. In other words, the terminal device determines logical channels whose sizes of to-be-sent data are included in the second information.

Operation S202: If a priority of a second radio interface technology corresponding to a second logical channel in the logical channel set is not higher than the priority of the first radio interface technology, the terminal device cancels first information triggered by the second logical channel, where the second radio interface technology is a radio interface technology with a lowest priority in radio interface technologies corresponding to the second logical channel.

In one embodiment, when the terminal device determines that the priority of the second radio interface technology corresponding to the second logical channel (the second logical channel is any logical channel in the logical channel set) in the logical channels is not higher than the priority of the first radio interface technology, and the second radio interface technology is the radio interface technology with the lowest priority in the radio interface technologies corresponding to the second logical channel, the terminal device determines that a delay requirement of the second logical channel is met when the second information including the first information triggered by the second logical channel is sent in the first radio interface technology, and therefore the terminal device cancels the first information triggered by the second logical channel.

Operation S203: If a priority of a third radio interface technology corresponding to each logical channel in a logical channel group corresponding to the second logical channel is not higher than the priority of the first radio interface technology, the terminal device cancels first information triggered by the second logical channel, where the third radio interface technology corresponding to each logical channel is a radio interface technology with a lowest priority in radio interface technologies corresponding to each logical channel in the logical channel group corresponding to the second logical channel.

In one embodiment, when the terminal device determines that the priority of the third radio interface technology corresponding to each logical channel in the logical channel group corresponding to the second logical channel (a third radio interface technology corresponding to a logical channel is a radio interface technology with a lowest priority in radio interface technologies corresponding to the logical channel) is not higher than the priority of the first radio interface technology, it indicates that the terminal device determines that a delay requirement of each logical channel in the logical channel group in which the second logical channel is located is met when the second information (the second information includes the first information triggered by the second logical channel) is sent in the first radio interface technology, and in this case, the terminal device may cancel the first information triggered by the second logical channel.

Operation S204: If a priority of a fourth radio interface technology corresponding to each logical channel in a radio interface technology corresponding to the second logical channel is not higher than the priority of the first radio interface technology, the terminal device cancels first information triggered by the second logical channel, where the fourth radio interface technology corresponding to each logical channel is a radio interface technology with a lowest priority in radio interface technologies corresponding to each logical channel in the radio interface technology corresponding to the second logical channel.

In one embodiment, when the terminal device determines that the priority of the fourth radio interface technology corresponding to each logical channel in the radio interface technology corresponding to the second logical channel (a fourth radio interface technology corresponding to a logical channel is a radio interface technology with a lowest priority in radio interface technologies corresponding to the logical channel) is not higher than the priority of the first radio interface technology, it indicates that the terminal device determines that a delay requirement of each logical channel in the radio interface technology corresponding to the second logical channel is met when the second information (the second information includes the first information triggered by the second logical channel) is sent in the first radio interface technology, and in this case, the terminal device may cancel the first information triggered by the second logical channel.

Operation S205: If a priority of a fifth radio interface technology corresponding to each logical channel with to-be-sent data in the logical channel set is not higher than the priority of the first radio interface technology, the terminal device cancels first information triggered by the second logical channel, where the fifth radio interface technology corresponding to each logical channel with to-be-sent data is a radio interface technology with a lowest priority in radio interface technologies corresponding to each logical channel with to-be-sent data in the logical channel set.

In one embodiment, when the terminal device determines that the priority of the fifth radio interface technology corresponding to each logical channel with to-be-sent data in the logical channel set (a fifth radio interface technology corresponding to a logical channel with to-be-sent data is a radio interface technology with a lowest priority in radio interface technologies corresponding to the logical channel) is not higher than the priority of the first radio interface technology, it indicates that the terminal device determines that a delay requirement of each logical channel with to-be-sent data in the logical channel set is met when the second information (the second information includes the first information triggered by the second logical channel) is sent in the first radio interface technology, and in this case, the terminal device may cancel the first information triggered by the second logical channel.

According to the information processing method provided in this application, the terminal device determines, from the at least one radio interface technology in which there is an uplink resource, the first radio interface technology used to send the first information, and then determines, based on the first information and the priority of the first radio interface technology, whether to cancel the first information that is in the triggered state, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

FIG. 4 is a flowchart of another embodiment of the information processing method according to this application. This embodiment relates to another specific process in which the terminal device determines, based on the first information, the priority of the first radio interface technology, and whether an acknowledgement response returned by the radio access network device is received, whether to cancel the first information that is in the triggered state. In this embodiment, an example in which the first information is a BSR and the second information including the first information is a BSR MAC CE is used. The first information may include sizes of to-be-sent data of all logical channels, or may include only a size of to-be-sent data on a logical channel that triggers the first information, or may include sizes of to-be-sent data of some logical channels. This is not limited in this embodiment. The second information may include first information triggered by all logical channels, and such first information may be one piece. The second information may alternatively include only one piece of first information, and there may be a plurality of such second information. In addition, in this application, the first radio interface technology is a radio interface technology with a highest priority in the radio interface technologies that are of the terminal device and in which there is an uplink resource. Based on the foregoing embodiment, S102 may specifically include the following operations.

Operation S301: The terminal device determines a logical channel set corresponding to second information including the first information. Then, perform operations S302, S303, S304, or S305.

In this embodiment, operations S302, S303, S304, and S305 are four parallel embodiments. After the terminal device packetizes the first information into the second information, the terminal device determines the logical channel set corresponding to the second information. In other words, the terminal device determines logical channels whose sizes of to-be-sent data are included in the second information.

Operation S302: If a priority of a sixth radio interface technology corresponding to a third logical channel in the logical channel set is higher than the priority of the first radio interface technology, and an acknowledgement response returned by the radio access network device for the first information is received after the second information is sent by using the first radio interface technology, the terminal device cancels first information triggered by the third logical channel before the second information is packetized, where the sixth radio interface technology is a radio interface technology with a lowest priority in radio interface technologies corresponding to the third logical channel.

In one embodiment, when the terminal device determines that the priority of the sixth radio interface technology corresponding to the third logical channel (the third logical channel is any logical channel in the logical channel set) in the logical channel set is higher than the priority of the first radio interface technology, and the sixth radio interface technology is the radio interface technology with the lowest priority in the radio interface technologies corresponding to the third logical channel, a delay requirement of the third logical channel is not met when the terminal device sends, in the first radio interface technology, the second information including the first information triggered by the third logical channel. However, when the terminal device receives the acknowledgement response sent by the radio access network device for the first information after sending the second information (the second information includes the first information triggered by the third logical channel) by using the first radio interface technology, it indicates that the first information has been received by a base station, and therefore the terminal device may cancel the first information triggered by the third logical channel before the second information is packetized and cannot cancel first information triggered by the third logical channel after the second information is packetized. This is because new first information after the second information is packetized is not included in the initial second information, and new second information may be sent to notify the radio access network device.

For example, it is assumed that the terminal device includes two logical channels: a logical channel 1 and a logical channel 2 (it is assumed that the third logical channel is the logical channel 1). The two logical channels separately trigger a BSR, and each BSR includes a size of to-be-sent data on a logical channel that triggers the BSR. To send the two BSRs to the radio access network device, the terminal device may packetize the two pieces of first information into a BSR MAC CE. It is assumed that the terminal device packetizes the two BSRs into one BSR MAC CE at a moment t, the UE sends the BSR MAC CE at a moment t+2, and the UE receives an acknowledgement response from the radio access network device at a moment t+6. In this case, the UE cancels all BSRs triggered by the logical channel 1 before the moment t.

Operation S303: If a priority of a seventh radio interface technology corresponding to any logical channel in a logical channel group in which a third logical channel in the logical channel set is located is higher than the priority of the first radio interface technology, and an acknowledgement response returned by the radio access network device for the first information is received after the second information is sent by using the first radio interface technology, the terminal device cancels first information triggered by the third logical channel before the second information is packetized, where the seventh radio interface technology is a radio interface technology with a lowest priority in radio interface technologies corresponding to any logical channel in the logical channel group in which the third logical channel is located.

In one embodiment, when the terminal device determines that the priority of the seventh radio interface technology corresponding to any logical channel (assumed to be a logical channel AA) in the logical channel group in which the third logical channel is located is higher than the priority of the first radio interface technology, and the seventh radio interface technology is a radio interface technology with a lowest priority in radio interface technologies corresponding to the logical channel AA, when the terminal device sends, in the first radio interface technology, the second information including the first information triggered by the third logical channel, it indicates that sending the second information by the terminal device in the first radio interface technology does not meet a delay requirement of sending the entire logical channel group. However, when the terminal device receives the acknowledgement response sent by the radio access network device for the first information after sending the second information (the second information includes the first information triggered by the third logical channel) by using the first radio interface technology, it indicates that the first information has been received by a base station, and therefore the terminal device may cancel the first information triggered by the third logical channel before the second information is packetized. For a specific cancellation process, refer to the example described in operation S302.

Operation S304: If a priority of an eighth radio interface technology corresponding to any logical channel in a radio interface technology corresponding to a third logical channel in the logical channel set is higher than the priority of the first radio interface technology, and an acknowledgement response returned by the radio access network device for the first information is received after the second information is sent by using the first radio interface technology, the terminal device cancels first information triggered by the third logical channel before the second information is packetized, where the eighth radio interface technology is a radio interface technology with a lowest priority in radio interface technologies corresponding to any logical channel in the radio interface technology corresponding to the third logical channel.

In one embodiment, when the terminal device determines that the priority of the eighth radio interface technology corresponding to any logical channel (assumed to be a logical channel BB) in the radio interface technology corresponding to the third logical channel is higher than the priority of the first radio interface technology, and the eighth radio interface technology is a radio interface technology with a lowest priority in radio interface technologies corresponding to the logical channel BB, when the terminal device sends, in the first radio interface technology, the second information including the first information triggered by the third logical channel, it indicates that sending the second information by the terminal device in the first radio interface technology does not meet a delay requirement of a logical channel in the radio interface technology corresponding to the third logical channel. However, when the terminal device receives the acknowledgement response sent by the radio access network device for the first information after sending the second information (the second information includes the first information triggered by the third logical channel) by using the first radio interface technology, it indicates that the first information has been received by a base station, and therefore the terminal device may cancel the first information triggered by the third logical channel before the second information is packetized. For a specific cancellation process, refer to the example described in operation S302.

Operation S305: If a priority of a ninth radio interface technology corresponding to any logical channel with to-be-sent data in the logical channel set is higher than the priority of the first radio interface technology, and an acknowledgement response returned by the radio access network device for the first information is received after the second information is sent by using the first radio interface technology, the terminal device cancels first information triggered by the third logical channel before the second information is packetized, where the ninth radio interface technology is a radio interface technology with a lowest priority in radio interface technologies corresponding to any logical channel with to-be-sent data in the logical channel set.

In one embodiment, when the terminal device determines that the priority of the ninth radio interface technology corresponding to any logical channel (assumed to be a logical channel CC) with to-be-sent data in the logical channel set is higher than the priority of the first radio interface technology, and the ninth radio interface technology is a radio interface technology with a lowest priority in radio interface technologies corresponding to the logical channel CC, when the terminal device sends, in the first radio interface technology, the second information including the first information triggered by the third logical channel, it indicates that sending the second information by the terminal device in the first radio interface technology does not meet a delay requirement of a logical channel with to-be-sent data. However, when the terminal device receives the acknowledgement response sent by the radio access network device for the first information after sending the second information (the second information includes the first information triggered by the third logical channel) by using the first radio interface technology, it indicates that the first information has been received by a base station, and therefore the terminal device may cancel the first information triggered by the third logical channel before the second information is packetized. For a specific cancellation process, refer to the example described in operation S302.

According to the information processing method provided in this application, the terminal device determines, from the at least one radio interface technology in which there is an uplink resource, the first radio interface technology used to send the first information, and then determines, based on the first information, the priority of the first radio interface technology, and whether an acknowledgement response returned by the radio access network device is received, whether to cancel the first information that is in the triggered state, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

Figure 5:
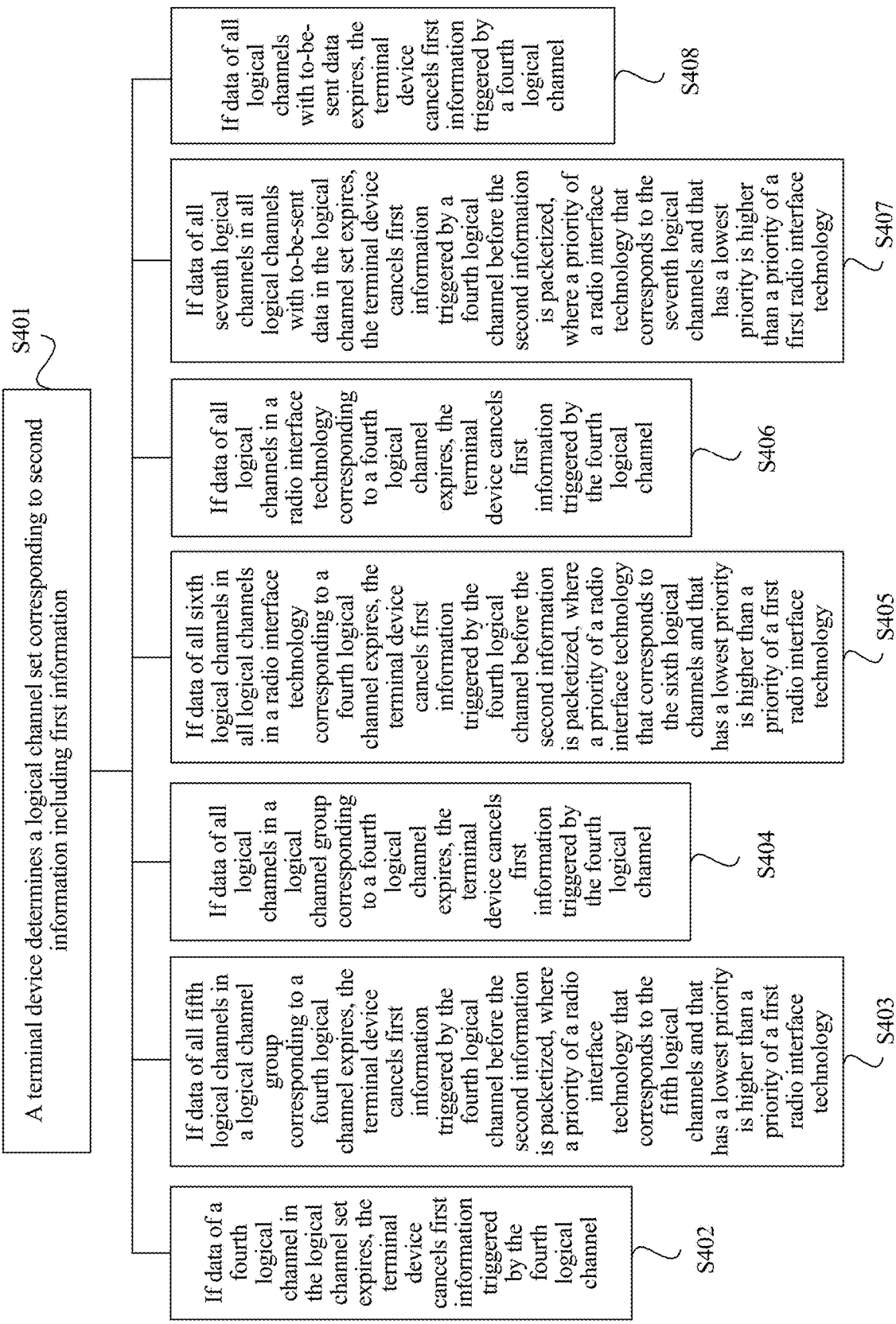
FIG. 5 is a flowchart of another embodiment of an information processing method according to this application.

FIG. 5 is a flowchart of another embodiment of the information processing method according to this application. This embodiment relates to a specific process in which the terminal device determines, based on whether data on a logical channel in the logical channel set corresponding to the second information including the first information expires, whether to cancel the first information that is in the triggered state. In this embodiment, an example in which the first information is a BSR and the second information including the first information is a BSR MAC CE is used. The first information may include sizes of to-be-sent data of all logical channels, or may include only a size of to-be-sent data on a logical channel that triggers the first information, or may include sizes of to-be-sent data of some logical channels. This is not limited in this embodiment. The second information may include first information triggered by all logical channels, and there may be one piece of such first information. The second information may alternatively include only one piece of first information, and there may be a plurality of such second information. In addition, in this application, the first radio interface technology is a radio interface technology with a highest priority in the radio interface technologies that are of the terminal device and in which there is an uplink resource. Based on the foregoing embodiment, operation S102 may specifically include the following operations.

Operation S401: The terminal device determines a logical channel set corresponding to second information including the first information.

In this embodiment, operations S402 to S408 are seven parallel embodiments. After the terminal device packetizes the first information into the second information, the terminal device determines the logical channel set corresponding to the second information. In other words, the terminal device determines logical channels whose sizes of to-be-sent data are included in the second information.

Operation S402: If data of a fourth logical channel in the logical channel set expires, the terminal device cancels first information triggered by the fourth logical channel.

In one embodiment, the fourth logical channel is any logical channel in the logical channel set, and when the data of the fourth logical channel in the logical channel set expires, the terminal device cancels the first information triggered by the fourth logical channel.

For data expiration herein, the terminal device may use a timer to determine whether data expires. For example, the data is not sent when the timer expires, and in this case, the terminal device determines that the data expires. Alternatively, the terminal device determines that a data delay exceeds a preset data validity period, and in this case, the terminal device determines that the data expires.

Operation S403: If data of all fifth logical channels in a logical channel group corresponding to the fourth logical channel expires, the terminal device cancels first information triggered by the fourth logical channel before the second information is packetized, where a priority of a radio interface technology that corresponds to the fifth logical channels and that has a lowest priority is higher than the priority of the first radio interface technology.

In one embodiment, the terminal device determines the logical channel group in which the fourth logical channel is located, the logical channel group includes at least one fifth logical channel, and the fifth logical channel herein is a logical channel of which a radio interface technology with a lowest priority is higher than the first radio interface technology. When the terminal device determines that the data of all the fifth logical channels in a logical channel group corresponding to the fourth logical channel expires, the terminal device cancels the first information triggered by the fourth logical channel before the second information is packetized.

For example, it is assumed that the logical channel set that is determined by the terminal device and that corresponds to the second information includes two logical channels: a logical channel 1 and a logical channel 2 (it is assumed that the fourth logical channel is the logical channel 1). The two logical channels separately trigger a BSR, and each BSR includes a size of to-be-sent data on a logical channel that triggers the BSR. To send the two BSRs to the radio access network device, the terminal device may packetize the two pieces of first information into a BSR MAC CE. It is assumed that the terminal device packetizes the two BSRs into one BSR MAC CE at a moment t, and the UE sends the BSR MAC CE at a moment t+2. It is assumed that the logical channel group in which the fourth logical channel is located includes the logical channel 1, a logical channel 3, and a logical channel 4. In radio interface technologies respectively corresponding to the logical channel 3 and the logical channel 4, a priority of a radio interface technology with a lowest priority is higher than the priority of the first radio interface technology. In other words, the logical channel 3 and the logical channel 4 are fifth logical channels. It is assumed that data on the logical channels 3 and 4 expires at a moment t+3, and in this case, the terminal device cancels first information triggered by the logical channel 1 before the moment t.

Operation S404: If data of all logical channels in a logical channel group corresponding to the fourth logical channel expires, the terminal device cancels first information triggered by the fourth logical channel.

According to the example in operation S403, when data of all the logical channel 1, the logical channel 3, and the logical channel 4 in the logical channel group in which the fourth logical channel is located expires, the terminal device cancels the first information triggered by the fourth logical channel.

Operation S405: If data of all sixth logical channels in all logical channels in a radio interface technology corresponding to the fourth logical channel expires, the terminal device cancels first information triggered by the fourth logical channel before the second information is packetized, where a priority of a radio interface technology that corresponds to the sixth logical channels and that has a lowest priority is higher than the priority of the first radio interface technology.

In one embodiment, the terminal device determines all the logical channels in the radio interface technology corresponding to the fourth logical channel, these logical channels include one or more sixth logical channels, and the sixth logical channel is a logical channel of which a priority of a radio interface technology with a lowest priority is higher than the priority of the first radio interface technology. When the terminal device learns that the data of all the sixth logical channels in all the logical channels in the radio interface technology corresponding to the fourth logical channel expires, the terminal device cancels the first information triggered by the fourth logical channel before the second information is packetized. For a specific cancellation process, refer to the example described in operation S403.

Operation S406: If data of all logical channels in a radio interface technology corresponding to the fourth logical channel expires, the terminal device cancels first information triggered by the fourth logical channel.

Operation S407: If data of all seventh logical channels in all logical channels with to-be-sent data in the logical channel set expires, the terminal device cancels first information triggered by the fourth logical channel before the second information is packetized, where a priority of a radio interface technology that corresponds to the seventh logical channels and that has a lowest priority is higher than the priority of the first radio interface technology.

In one embodiment, the terminal device determines all the logical channels with to-be-sent data in the logical channel set, these logical channels with to-be-sent data include one or more seventh logical channels, and the seventh logical channel is a logical channel of which a priority of a radio interface technology with a lowest priority is higher than the priority of the first radio interface technology. When the terminal device learns that the data of all the seventh logical channels in all the logical channels with to-be-sent data expires, the terminal device cancels the first information triggered by the fourth logical channel before the second information is packetized. For a specific cancellation process, refer to the example described in operation S403.

Operation S408: If data of all logical channels with to-be-sent data expires, the terminal device cancels first information triggered by the fourth logical channel.

According to the information processing method provided in this application, the terminal device determines, from the at least one radio interface technology in which there is an uplink resource, the first radio interface technology used to send the first information, and then determines, based on whether the data on the logical channel in the logical channel set corresponding to the second information including the first information expires and the priority of the first radio interface technology, whether to cancel the first information that is in the triggered state, thereby improving accuracy of canceling the first information that is in the triggered state. In addition, when the terminal device determines not to cancel the first information that is in the triggered state, the terminal device may resend the first information in a condition ready for transmission, thereby avoiding a process in which the terminal device needs to regenerate the first information, and shortening a data sending delay.

Figure 6:
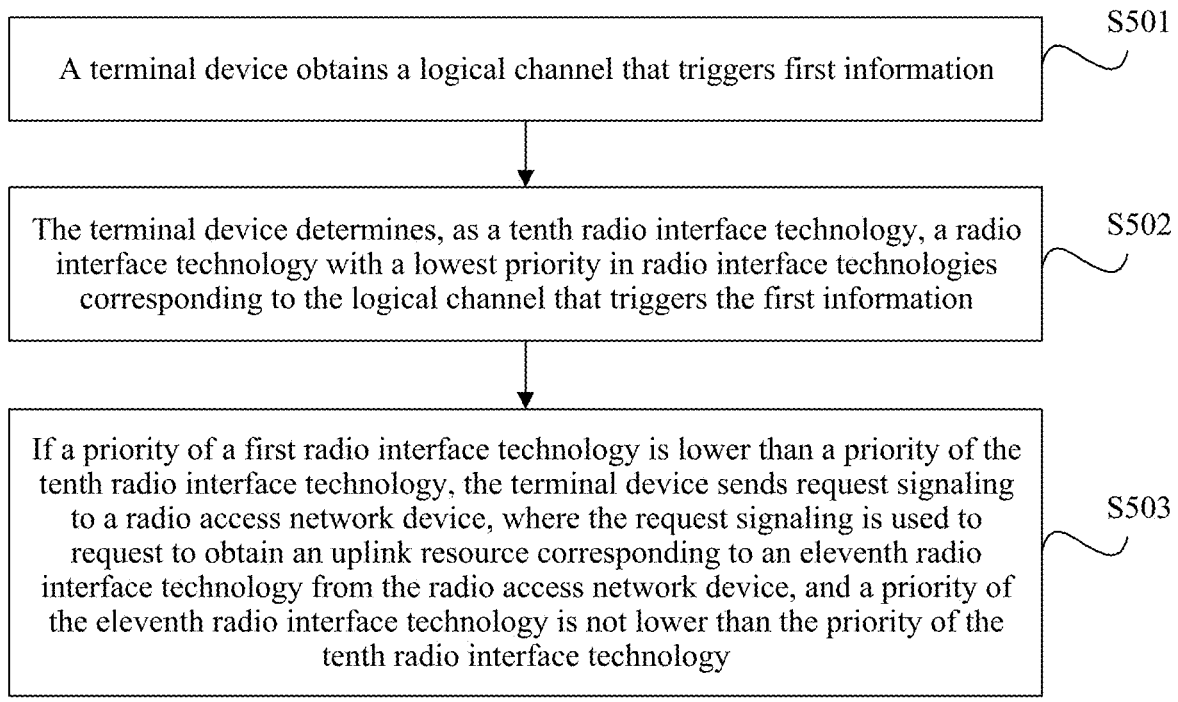
FIG. 6 is a flowchart of Embodiment 2 of an information processing method according to this application.

FIG. 6 is a flowchart of Embodiment 2 of an information processing method according to this application. This embodiment relates to a specific process in which when a terminal device uses a first radio interface technology to send second information including first information, the first radio interface technology does not meet a delay requirement of a logical channel that triggers the first information, and the terminal device requests a resource from a radio access network device. As shown in FIG. 6, the method specifically includes the following operations.

Operation S501: The terminal device obtains the logical channel that triggers the first information.

Operation S502: The terminal device determines, as a tenth radio interface technology, a radio interface technology with a lowest priority in radio interface technologies corresponding to the logical channel that triggers the first information.

Operation S503: If a priority of the first radio interface technology is lower than a priority of the tenth radio interface technology, the terminal device sends request signaling to the radio access network device, where the request signaling is used to request to obtain an uplink resource corresponding to an eleventh radio interface technology from the radio access network device, and a priority of the eleventh radio interface technology is not lower than the priority of the tenth radio interface technology.

In one embodiment, the terminal device predetermines the radio interface technology (namely, the tenth radio interface technology) with the lowest priority in the radio interface technologies corresponding to the logical channel that triggers the first information. When the priority of the first radio interface technology is lower than the priority of the tenth radio interface technology, because the tenth radio interface technology is the radio interface technology with the lowest priority of the logical channel that triggers the first information, in other words, the tenth radio interface technology is a radio interface technology that has a lowest priority and that can meet the delay requirement of the logical channel that triggers the first information, it indicates that the first radio interface technology cannot meet the delay requirement of the logical channel that triggers the first information. Therefore, the terminal device may send the request signaling to the radio access network device, to notify the radio access network device that the terminal device requires an uplink resource in the eleventh radio interface technology. In one embodiment, the request signaling may be SR (scheduling request) signaling. After receiving the request signaling, the radio access network device configures an uplink resource for the eleventh radio interface technology of the terminal device. The priority of the eleventh radio interface technology is higher than the priority of the tenth radio interface technology. Therefore, when the terminal device sends the second information including the first information in the eleventh radio interface technology, the delay requirement of the logical channel that triggers the first information can be met.

In one embodiment, if no uplink resource exists in all radio interface technologies of the terminal device, the terminal device may directly send the request signaling to the radio access network device, to request the radio access network device to select a radio interface technology whose priority is higher than a priority of a radio interface technology corresponding to the logical channel that triggers the first information.

According to the information processing method provided in this application, when the priority of the first radio interface technology is lower than the priority of the tenth radio interface technology that has a lowest priority and that corresponds to the logical channel that triggers the first information in the second information, the terminal device sends the request signaling to the radio access network device, to obtain the uplink resource in the eleventh radio interface technology whose priority is higher than the priority of the tenth radio interface technology, with no need to keep waiting for a resource in the eleventh radio interface technology to send the second information. Therefore, sending efficiency of the second information is improved, and a data sending delay of the terminal device is reduced.

Figure 7:
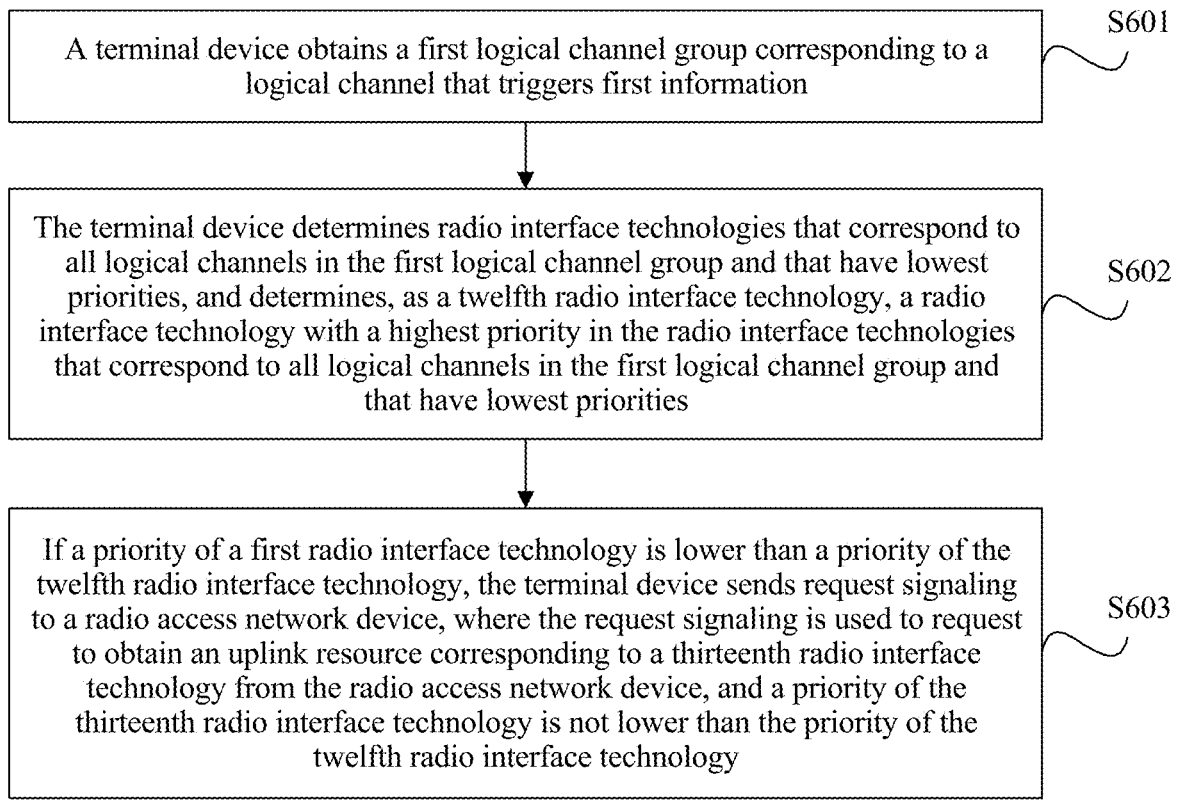
FIG. 7 is a flowchart of Embodiment 3 of an information processing method according to this application.

FIG. 7 is a flowchart of Embodiment 3 of an information processing method according to this application. This embodiment relates to another specific process in which a terminal device requests a resource from a radio access network device. As shown in FIG. 7, the method specifically includes the following operations.

Operation S601: The terminal device obtains a first logical channel group corresponding to a logical channel that triggers first information.

Operation S602: The terminal device determines radio interface technologies that correspond to all logical channels in the first logical channel group and that have lowest priorities, and determines, as a twelfth radio interface technology, a radio interface technology with a highest priority in the radio interface technologies that correspond to all logical channels in the first logical channel group and that have lowest priorities.

Operation S603: If a priority of the first radio interface technology is lower than a priority of the twelfth radio interface technology, the terminal device sends request signaling to the radio access network device, where the request signaling is used to request to obtain an uplink resource corresponding to a thirteenth radio interface technology from the radio access network device, and a priority of the thirteenth radio interface technology is not lower than the priority of the twelfth radio interface technology.

In one embodiment, after obtaining the logical channel that triggers the first information, the terminal device determines a logical channel group (the logical channel group is referred to as the first logical channel group in this embodiment) in which the logical channel is located. Then, the terminal device determines radio interface technologies corresponding to each logical channel in the first logical channel group, and for each logical channel, selects a radio interface technology with a lowest priority from the radio interface technologies corresponding to each logical channel. In this way, the terminal device obtains the radio interface technologies that are of all logical channels in the first logical channel group and that have lowest priorities, and then selects, as the twelfth radio interface technology, the radio interface technology with the highest priority from the radio interface technologies that correspond to these logical channels and that have lowest priorities.

When the priority of the first radio interface technology is lower than the priority of the twelfth radio interface technology, it indicates that the first radio interface technology cannot meet a delay requirement of the first logical channel group. In this case, the terminal device sends the request signaling to the radio access network device, to notify the radio access network device that the terminal device requires an uplink resource in the thirteenth radio interface technology. In one embodiment, the request signaling may be SR signaling. After receiving the request signaling, the radio access network device configures an uplink resource for the thirteenth radio interface technology of the terminal device. The priority of the thirteenth radio interface technology is higher than the priority of the twelfth radio interface technology. Therefore, when the terminal device sends second information including the first information in the thirteenth radio interface technology, the delay requirement of the first logical channel group can be met.

According to the information processing method provided in this application, when the priority of the first radio interface technology is lower than the priority of the twelfth radio interface technology that meets the delay requirement of the first logical channel group in which the logical channel that triggers the first information is located, the terminal device sends the request signaling to the radio access network device, to obtain the uplink resource in the thirteenth radio interface technology whose priority is higher than the priority of the twelfth radio interface technology, with no need to keep waiting for a resource in the thirteenth radio interface technology to send the second information. Therefore, sending efficiency of the second information is improved, and a data sending delay of the terminal device is reduced.

Figure 8:
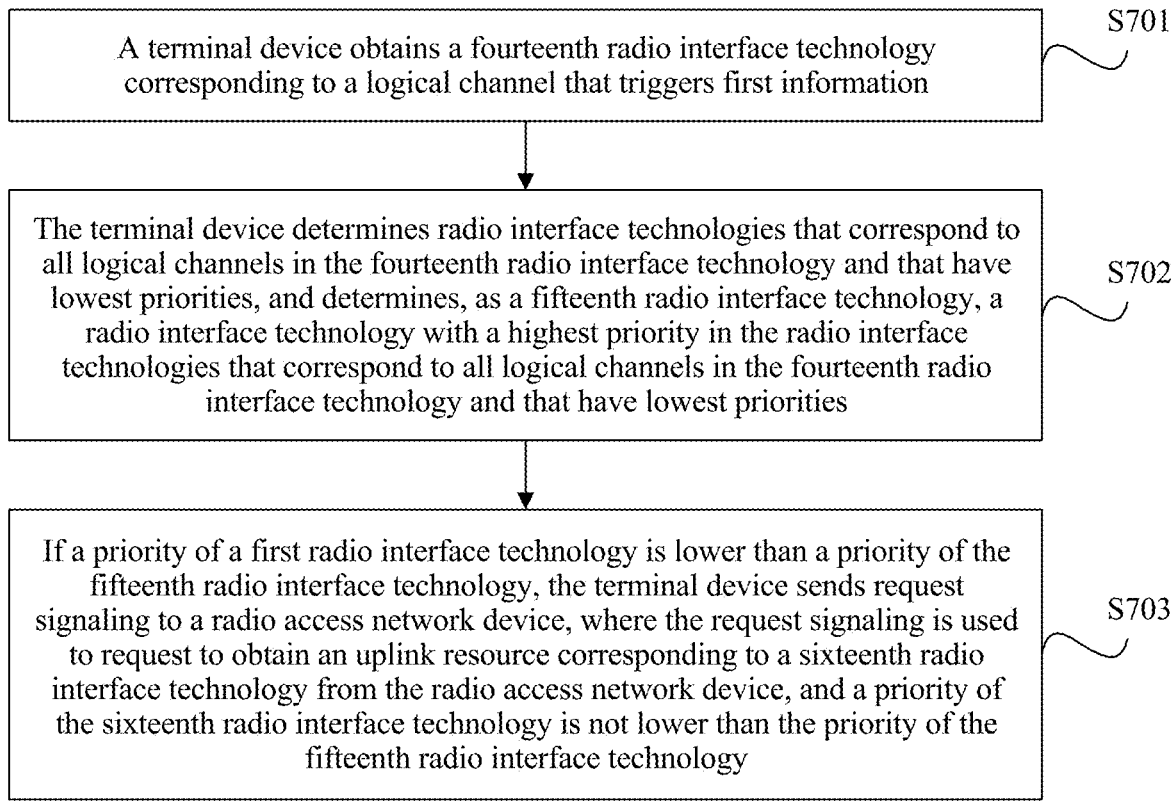
FIG. 8 is a flowchart of Embodiment 4 of an information processing method according to this application.

FIG. 8 is a flowchart of Embodiment 4 of an information processing method according to this application. This embodiment relates to another specific process in which a terminal device requests a resource from a radio access network device. As shown in FIG. 8, the method specifically includes the following operations.

Operation S701: The terminal device obtains a fourteenth radio interface technology corresponding to a logical channel that triggers the first information.

Operation S702: The terminal device determines radio interface technologies that correspond to all logical channels in the fourteenth radio interface technology and that have lowest priorities, and determines, as a fifteenth radio interface technology, a radio interface technology with a highest priority in the radio interface technologies that correspond to all logical channels in the fourteenth radio interface technology and that have lowest priorities.

Operation S703: If a priority of the first radio interface technology is lower than a priority of the fifteenth radio interface technology, the terminal device sends request signaling to the radio access network device, where the request signaling is used to request to obtain an uplink resource corresponding to a sixteenth radio interface technology from the radio access network device, and a priority of the sixteenth radio interface technology is not lower than the priority of the fifteenth radio interface technology.

In one embodiment, after obtaining the fourteenth radio interface technology corresponding to the logical channel that triggers the first information, the terminal device determines radio interface technologies corresponding to each logical channel in the fourteenth radio interface technology, and for each logical channel in the fourteenth radio interface technology, selects a radio interface technology with a lowest priority from the radio interface technologies corresponding to each logical channel in the fourteenth radio interface technology. In this way, the terminal device obtains the radio interface technologies that are of all logical channels in the fourteenth radio interface technology and that have lowest priorities, and then selects, as the fifteenth radio interface technology, the radio interface technology with the highest priority from the radio interface technologies that correspond to these logical channels and that have lowest priorities.

When the priority of the first radio interface technology is lower than the priority of the fifteenth radio interface technology, it indicates that the first radio interface technology cannot meet a delay requirement of the logical channel in the fourteenth radio interface technology. In this case, the terminal device sends the request signaling to the radio access network device, to notify the radio access network device that the terminal device requires an uplink resource in the sixteenth radio interface technology. In one embodiment, the request signaling may be SR signaling. After receiving the request signaling, the radio access network device configures an uplink resource for the sixteenth radio interface technology of the terminal device. The priority of the sixteenth radio interface technology is higher than the priority of the fifteenth radio interface technology. Therefore, when the terminal device sends second information including the first information in the sixteenth radio interface technology, the delay requirement of the logical channel in the fourteenth radio interface technology can be met.

According to the information processing method provided in this application, when the priority of the first radio interface technology is lower than the priority of the fifteenth radio interface technology that meets the delay requirement of the logical channel in the fourteenth radio interface technology corresponding to the logical channel that triggers the first information, the terminal device sends the request signaling to the radio access network device, to obtain the uplink resource in the sixteenth radio interface technology whose priority is higher than the priority of the fifteenth radio interface technology, with no need to keep waiting for a resource in the fifteenth radio interface technology to send the second information. Therefore, sending efficiency of the second information is improved, and a data sending delay of the terminal device is reduced.

Figure 9:
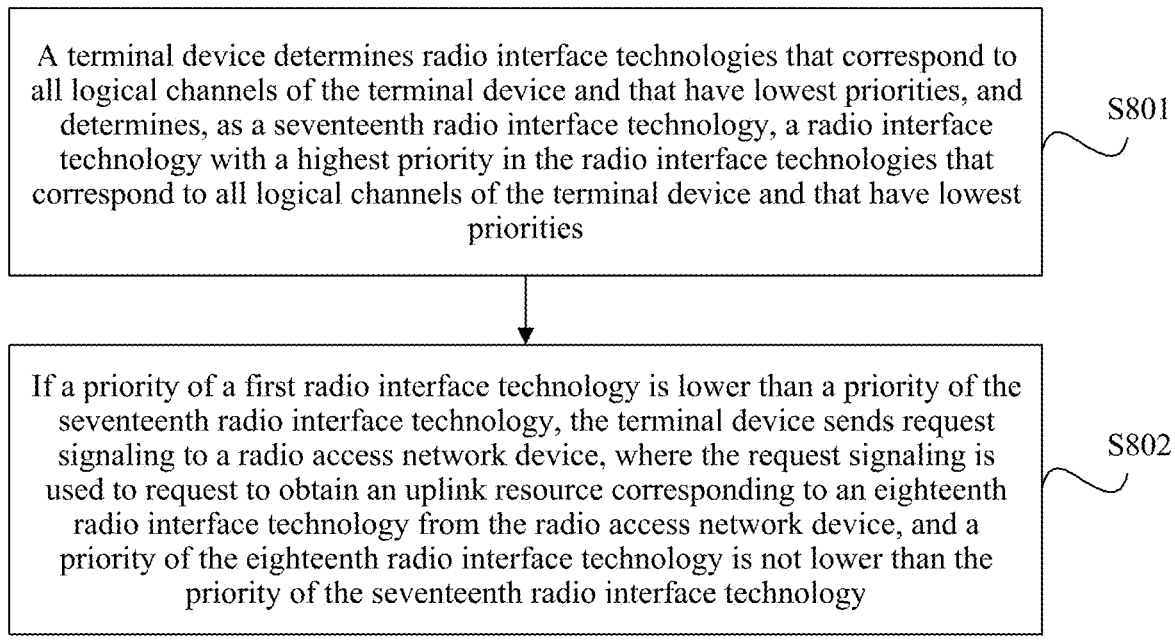
FIG. 9 is a flowchart of Embodiment 5 of an information processing method according to this application.

FIG. 9 is a flowchart of Embodiment 5 of an information processing method according to this application. This embodiment relates to another specific process in which a terminal device requests a resource from a radio access network device. As shown in FIG. 9, the method specifically includes the following operations.

Operation S801: The terminal device determines radio interface technologies that correspond to all logical channels of the terminal device and that have lowest priorities, and determines, as a seventeenth radio interface technology, a radio interface technology with a highest priority in the radio interface technologies that correspond to all logical channels of the terminal device and that have lowest priorities.

Operation S802: If a priority of the first radio interface technology is lower than a priority of the seventeenth radio interface technology, the terminal device sends request signaling to the radio access network device, where the request signaling is used to request to obtain an uplink resource corresponding to an eighteenth radio interface technology from the radio access network device, and a priority of the eighteenth radio interface technology is not lower than the priority of the seventeenth radio interface technology.

In one embodiment, the terminal device determines radio interface technologies corresponding to each logical channel of the terminal device, and then for each logical channel, selects a radio interface technology with a lowest priority from the radio interface technologies corresponding to each logical channel. In this way, the terminal device obtains the radio interface technologies that correspond to all logical channels and that have lowest priorities, and then selects, as the seventeenth radio interface technology, the radio interface technology with the highest priority from the radio interface technologies that correspond to all logical channels and that have lowest priorities.

When the priority of the first radio interface technology is lower than the priority of the seventeenth radio interface technology, it indicates that the first radio interface technology cannot meet a delay requirement of each logical channel of the terminal device. In this case, the terminal device sends the request signaling to the radio access network device, to notify the radio access network device that the terminal device requires an uplink resource in the eighteenth radio interface technology. In one embodiment, the request signaling may be SR signaling. After receiving the request signaling, the radio access network device configures an uplink resource for the eighteenth radio interface technology of the terminal device. The priority of the eighteenth radio interface technology is higher than the priority of the seventeenth radio interface technology. Therefore, when the terminal device sends second information including the first information in the eighteenth radio interface technology, the delay requirement of each logical channel of the terminal device can be met.

According to the information processing method provided in this application, when the priority of the first radio interface technology is lower than the priority of the seventeenth radio interface technology that meets the delay requirement of each logical channel of the terminal device, the terminal device sends the request signaling to the radio access network device, to obtain the uplink resource in the eighteenth radio interface technology whose priority is higher than the priority of the seventeenth radio interface technology, with no need to keep waiting for a resource in the eighteenth radio interface technology to send the second information. Therefore, sending efficiency of the second information is improved, and a data sending delay of the terminal device is reduced.

In one embodiment, with reference to any one of the embodiments in FIG. 6 to FIG. 9, when the terminal device cancels the first information that is in the triggered state, correspondingly, the terminal device also cancels all request signaling triggered by the first information.

In one embodiment, when the terminal device cancels the first information that is in the triggered state, the terminal device starts or restarts a retxBSR-Timer of the logical channel that triggers the first information, and the retxBSR-Timer may be used to determine whether data on the logical channel that triggers the first information expires. When the retxBSR-Timer expires, if there is data on the logical channel that triggers the first information, the logical channel may trigger one piece of first information again.

In one embodiment, when the terminal device cancels the first information that is in the triggered state, the terminal device starts or restarts a retxBSR-Timer of the logical channel group in which the logical channel that triggers the first information is located. When the retxBSR-Timer expires, if there is data on any logical channel in the logical channel group, first information may be triggered again.

In one embodiment, when the terminal device cancels the first information that is in the triggered state, the terminal device starts or restarts a retxBSR-Timer of the radio interface technology corresponding to the logical channel that triggers the first information. When the retxBSR-Timer expires, if there is data on any logical channel in the radio interface technology, first information may be triggered again.

In one embodiment, when the terminal device cancels the first information that is in the triggered state, the terminal device starts or restarts a retxBSR-Timer of the terminal device. When the retxBSR-Timer expires, if there is data on any logical channel, first information is triggered again.

In one embodiment, after the second information is sent on an uplink resource corresponding to the first radio interface technology, if the first information is still in the triggered state, and if a prohibit timer of the terminal device does not run at this time, the terminal device may regenerate, based on the first information, one piece of second information for sending. Herein, the prohibit timer that does not run means that in this case, the terminal device has a validity period or a prohibition time period in which the second information is prohibited from being repeatedly sent in all radio interface technologies that cannot meet a delay requirement of a corresponding logical channel. Beyond the validity period, the second information may be repeatedly sent. Within the validity period, the terminal device may be prohibited from sending the second information again on an uplink resource in a radio interface technology that cannot meet the delay requirement of the corresponding logical channel, thereby preventing one piece of second information from being repeatedly sent in a radio interface technology with a relatively low priority. When the first information is canceled, the prohibit timer may be stopped at the same time.

With reference to the description in the foregoing embodiment, the first information may be a BSR, and the second information may be a BSR MAC CE. The following embodiment describes a specific structure of a BSR MAC CE provided in this application. It should be noted that this embodiment may alternatively exist alone, without being combined with the foregoing embodiment.

(1) When data arrives on a logical channel, a BSR of the logical channel is triggered, and what is reported once by the terminal device is a BSR MAC CE shown in Table 1. The BSR MAC CE includes only buffer information of the logical channel that triggers the BSR (the buffer information is a size of to-be-sent data on the logical channel). The BSR is used to indicate, to the radio access network device, the size of the to-be-sent data on the logical channel that triggers the BSR. For a format of the BSR MAC CE, refer to Table 1.

TABLE 1

| LCID | Buffer size |
| --- | --- |

An LCD is an identifier of the logical channel that triggers the BSR. A buffer size is the buffer information of the logical channel that triggers the BSR, and the buffer information includes the size of the to-be-sent data on the logical channel.

(2) When data arrives on a logical channel, a BSR of the logical channel is triggered, and what is reported once by the terminal device is a BSR MAC CE corresponding to each logical channel in a first logical channel group in which the logical channel is located. In other words, a plurality of independent BSR MAC CEs are reported. One BSR MAC CE includes an identifier of any logical channel in the first logical channel group in which the logical channel that triggers the BSR is located and a size of to-be-sent data of the any logical channel. In other words, each logical channel in the first logical channel group in which the logical channel that triggers the BSR is located corresponds to one BSR MAC CE in the format shown in Table 1. Logical channels corresponding to the plurality of BSR MAC CEs belong to a same logical channel group.

(3) When data arrives on a logical channel, a BSR of the logical channel is triggered, and what is reported once by the terminal device is a BSR MAC CE corresponding to each logical channel in a radio interface technology corresponding to the logical channel. In other words, a plurality of independent BSR MAC CEs are reported. One BSR MAC CE includes an identifier of any logical channel in the radio interface technology corresponding to the logical channel that triggers the BSR and a size of to-be-sent data of the any logical channel. In other words, each logical channel in the radio interface technology corresponding to the logical channel that triggers the BSR corresponds to one BSR MAC CE in the format shown in Table 1. Logical channels corresponding to the plurality of BSR MAC CEs correspond to a same radio interface technology.

(4) When data arrives on a logical channel, what is reported once by the terminal device is a BSR MAC CE corresponding to each logical channel that is of the terminal device and that has to-be-sent data. In other words, a plurality of independent BSR MAC CEs are reported. One BSR MAC CE includes an identifier of any logical channel of the terminal device and a size of to-be-sent data of the any logical channel. In other words, each logical channel of the terminal device corresponds to one BSR MAC CE in the format shown in Table 1.

(5) When data arrives on a logical channel, a BSR of the logical channel is triggered, and a format of a BSR MAC CE reported by the terminal device is shown in Table 2. The BSR MAC CE includes an identifier of at least one logical channel in a first logical channel group in which the logical channel that triggers the BSR is located and a size of to-be-sent data of the at least one logical channel. In one embodiment, in the format, one BSR MAC CE may include an identifier of each logical channel in the first logical channel group in which the logical channel that triggers the BSR is located and a size of to-be-sent data on each logical channel. In one embodiment, when there is no to-be-sent data on some logical channels in the first logical channel group, identifiers and sizes of to-be-sent data of these logical channels may not be included in the BSR MAC CE.

TABLE 2

| LCID 1 | Buffer size 1 |
|---|---|
| LCID 2 | Buffer size 2 |
| ... | |
| LCID n | Buffer size n |

In Table 2, an LCID is an identifier of a logical channel in the first logical channel group in which the logical channel that triggers the BSR is located, and a buffer size is buffer information of a logical channel in the first logical channel group in which the logical channel that triggers the BSR is located.

(6) When data arrives on a logical channel, a BSR of the logical channel is triggered. For a format of a BSR MAC CE after the BSR is packetized, refer to Table 3. The BSR MAC CE includes a group identifier of at least one logical channel group in a radio interface technology corresponding to the logical channel that triggers the BSR and a size of to-be-sent data of the at least one logical channel group.

TABLE 3

| LCG ID 1 | Buffer size 1 |
|---|---|
| LCG ID 2 | Buffer size 2 |
| ... | |
| LCG ID n | Buffer size n |

In Table 3, an LCG ID is a group identifier of a logical channel group in the radio interface technology corresponding to the logical channel that triggers the BSR, and a buffer size is buffer information of a logical channel group in the radio interface technology corresponding to the logical channel that triggers the BSR.

(7) When data arrives on a logical channel, a BSR of the logical channel is triggered. For a format of a BSR MAC CE after the BSR is packetized, refer to Table 4. The BSR MAC CE includes an identifier of at least one logical channel in all logical channels of the terminal device and a size of to-be-sent data of the at least one logical channel. In one embodiment, in the format, the BSR MAC CE may include an identifier of each logical channel of the terminal device and a size of to-be-sent data on each logical channel. In one embodiment, when there is no to-be-sent data on some logical channels of the terminal device, identifiers and sizes of to-be-sent data of these logical channels may not be included in the BSR MAC CE.

TABLE 4

| LCID 1 | Buffer size 1 |
|---|---|
| LCID 2 | Buffer size 2 |
| ... | |
| LCID n | Buffer size n |

In Table 4, an LCID is the identifier of each logical channel of the terminal device, and a buffer size is buffer information of each logical channel of the terminal device.

(8) When data arrives on a logical channel, a BSR of the logical channel is triggered. For a format of a BSR MAC CE after the BSR is packetized, refer to Table 5. The BSR MAC CE includes an identifier of at least one logical channel group in all logical channel groups of the terminal device and a size of to-be-sent data of the at least one logical channel group. In one embodiment, in the format, the BSR MAC CE may include an identifier of each logical channel group of the terminal device and a size of to-be-sent data on each logical channel group. In one embodiment, when there is no to-be-sent data in some logical channel groups of the terminal device, identifiers and sizes of to-be-sent data of these logical channel groups may not be included in the BSR MAC CE.

TABLE 5

| LCG ID 1 | Buffer size 1 |
|---|---|
| LCG ID 2 | Buffer size 2 |
| ... | |
| LCG ID n | Buffer size n |

In Table 5, an LC G ID is the identifier of each logical channel group of the terminal device, and a buffer size is buffer information of each logical channel group of the terminal device.

In one embodiment, the same as a structure of a BSR MAC CE in an LTE mechanism, structures of the foregoing BSR MAC CEs may alternatively use a long BSR format in LTE. It should be noted that in the long BSR format in LTE, even if there is no data in buffers of some logical channel groups, it is mandatory to place buffer information in a long BSR to be reported to a base station.

Another embodiment of this application further provides a reconfiguration method, to be specific, a process in which a radio access network device reconfigures a mapping relationship between a logical channel and a radio interface technology. The radio access network device may reconfigure the mapping relationship between a logical channel and a radio interface technology by using higher layer signaling (for example, RRC signaling or a MAC CE).

In one embodiment, the radio access network device sends a new mapping relationship (reconfigured mapping relationship) between a logical channel and a radio interface technology to a terminal device, and the terminal device performs an operation based on the new mapping relationship between a logical channel and a radio interface technology. The operation herein includes: packetizing, by the terminal device, data based on a logical channel priority (LCP), and using an uplink resource to carry and send the data; or a BSR cancellation operation in this application. For example, when performing uplink sending, the terminal device first places, on the uplink resource based on the mapping relationship, data on a logical channel mapped to the radio interface technology, and if there is a remaining resource, a data sending requirement of a remaining logical channel is met. In the BSR cancellation operation in this application, the mapping relationship between a logical channel and a radio interface technology is also used. For example, whether a priority of a radio interface technology in which UE sends a BSR is higher than a priority of a radio interface technology to which a logical channel whose delay requirement needs to be met is mapped is determined.

In another embodiment, the radio access network device sends at least one mapping relationship between a logical channel and a radio interface technology and an index number of the mapping relationship to a terminal device, and indicates a currently used mapping relationship. When needing to reconfigure the mapping relationship, the radio access network device sends a new mapping relationship index number to the terminal device, to instruct the terminal device to use a mapping relationship corresponding to the mapping relationship index number. After receiving the new mapping relationship index number, the terminal device finds a new mapping relationship based on a previously stored mapping relationship and a corresponding index number, and performs an operation based on the new mapping relationship.

The radio access network device may further send configuration information of a radio interface technology to the terminal device, for example, a time-frequency resource location of the radio interface technology, a physical random access channel (PRACH) resource configuration of the radio interface technology, and a HARQ configuration of the radio interface technology. When the mapping relationship, of the terminal device, between a logical channel and a radio interface technology changes, radio interface technologies to which some logical channels are mapped may be radio interface technologies that have not been used by the terminal device or radio interface technologies not effectively configured by the terminal device. Therefore, the radio access network device may notify the terminal device of the configuration information of the radio interface technology.

According to the reconfiguration method provided in this application, the radio access network device reconfigures the mapping relationship, of the terminal device, between a logical channel and a radio interface technology, thereby resolving a disadvantage that reconfiguration of the mapping relationship between a logical channel and a radio interface technology is not supported.

Another embodiment of this application further provides a configuration method, to be specific, a process in which a radio access network device configures a hybrid automatic repeat request (HARQ) related timer for each radio interface technology by using higher layer signaling (the higher layer signaling may be RRC signaling, a MAC CE, or the like). The HARQ related timer includes a HARQ loopback timer, an uplink HARQ loopback timer, a retransmission timer, and an uplink retransmission timer. During the HARQ loopback timer and the uplink HARQ loopback timer, a terminal device may not need to listen to a PDCCH channel. During the retransmission timer and the uplink retransmission timer, the terminal device may listen to the PDCCH channel.

For clear description of this embodiment, specific concepts and applications of the HARQ loopback timer, the uplink HARQ loopback timer, the retransmission timer, and the uplink retransmission timer are first described herein.

Currently, one HARQ loopback timer is defined for each downlink HARQ process, and is started in a subframe in which the terminal device receives a physical downlink control channel (PDCCH) that indicates downlink transmission or in a last subframe in which the terminal device receives downlink data. For an uplink asynchronous HARQ, one uplink HARQ loopback timer is defined for each uplink HARQ process, and is started in a last subframe in which the terminal device sends uplink data.

During running of the HARQ loopback timer and the uplink HARQ loopback timer, if there is no other requirement for the terminal device to listen to a PDCCH channel, the terminal device does not need to listen to a PDCCH channel. When the HARQ loopback timer expires, the terminal device starts the retransmission timer. When the uplink HARQ loopback timer expires, the terminal device starts the uplink retransmission timer.

During running of the retransmission timer and the uplink retransmission timer, the terminal device may listen to the PDCCH channel, to obtain PDCCH signaling used to schedule retransmitted data.

The HARQ loopback timer and the uplink HARQ loopback timer actually represent a shortest time for the terminal device to receive retransmission scheduling after performing previous transmission of sending or receiving. Within the time, due to a signal transmission delay and processing delays of the access network device and the terminal device, it is impossible for the terminal device to receive retransmission scheduling from the access network device. Therefore, within the time, the terminal device may not listen to the PDCCH channel, to save energy.

In one embodiment, the radio access network device may configure a plurality of values and an index number of each value for each timer.

In one embodiment, the radio access network device may indicate one of the values by using PDCCH signaling, and the PDCCH signaling may carry an index number. The terminal device selects a corresponding value of a timer by using the index number.

In one embodiment, the radio access network device may further specifically indicate a radio interface technology by using PDCCH signaling, and may further determine a to-be-used set of timer values based on a radio interface technology corresponding to a PDCCH.

According to the configuration method provided in this application, the radio access network device configures the HARQ related timer for the radio interface technology, thereby resolving a disadvantage that configuration of the HARQ related timer is not supported.

In the several embodiments provided in this application, it should be understood that the disclosed method may be implemented in other manners without departing from the scope of this application. It should be noted that as described in the foregoing embodiments, some embodiments or some possible implementations in this application may have some direct or indirect association relationships or attachment relationships, but division of association relationships in the foregoing embodiments is merely used as an example for explanation and description. However, a person skilled in the art may understand that some embodiments may alternatively exist as independent embodiments, and are not necessarily dependent on the foregoing embodiments.

Figure 10:
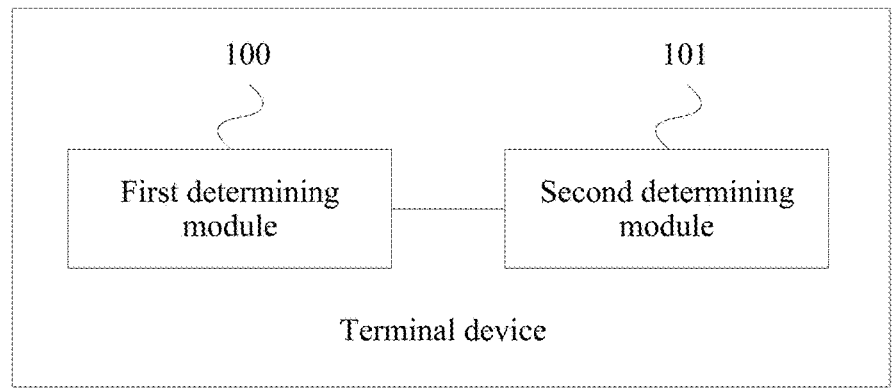
FIG. 10 is a structural diagram of an embodiment of a terminal device according to this application.

FIG. 10 is a structural diagram of an embodiment of a terminal device according to this application. In this embodiment, the terminal device may be implemented by using software, hardware, or a combination of software and hardware. As shown in FIG. 10, the terminal device includes a first determining module 100 and a second determining module 101.

The first determining module 100 is configured to determine, from at least one radio interface technology, a first radio interface technology used to send first information, where each of the at least one radio interface technology corresponds to an uplink resource, and the first information includes a size of to-be-sent data of at least one logical channel of the terminal device.

The second determining module 101 is configured to determine, based on the first information and attribute information of the first radio interface technology, whether to cancel the first information that is in a triggered state, where the attribute information of the first radio interface technology includes a priority of the first radio interface technology or an uplink resource corresponding to the first radio interface technology.

In one embodiment, the first determining module 100 and the second determining module 101 may correspond to a component such as a processor or a controller that has a processing function or a control function in the terminal device.

In one embodiment, the first radio interface technology is a radio interface technology with a highest priority in the at least one radio interface technology.

In one embodiment, the second determining module 101 is specifically configured to:

if a maximum transmission data volume of the uplink resource corresponding to each of the at least one radio interface technology is greater than or equal to a size of to-be-sent data on a logical channel corresponding to each radio interface technology, and a maximum transmission data volume of a remaining resource in the first radio interface technology is less than a size of second information including the first information, cancel all first information that is in the triggered state, where the remaining resource in the first radio interface technology is a resource excluding the uplink resource in the first radio interface technology occupied by to-be-sent data on a logical channel, the logical channel corresponding to the first radio interface technology.

In one embodiment, the second determining module 101 is specifically configured to:

if a maximum transmission data volume of an uplink resource corresponding to any one of the at least one radio interface technology is greater than or equal to a size of to-be-sent data on any first logical channel corresponding to the any radio interface technology, and a maximum transmission data volume of a remaining resource in the first radio interface technology is less than a size of first information triggered by the first logical channel, cancel the first information triggered by the first logical channel; or if a size of to-be-sent data on each logical channel in a logical channel group in which the first logical channel is located is less than or equal to a maximum transmission data volume of an uplink resource in a radio interface technology corresponding to each logical channel in the logical channel group, and a maximum transmission data volume of a remaining resource in the first radio interface technology is less than a size of first information triggered by the first logical channel, cancel the first information triggered by the first logical channel; or if a size of to-be-sent data on each logical channel in a radio interface technology corresponding to the first logical channel is less than or equal to a maximum transmission data volume of an uplink resource in a radio interface technology corresponding to each logical channel in the radio interface technology corresponding to the first logical channel, and a maximum transmission data volume of a remaining resource in the first radio interface technology is less than a size of first information triggered by the first logical channel, cancel the first information triggered by the first logical channel, where the remaining resource in the first radio interface technology is a resource excluding the uplink resource in the first radio interface technology occupied by first information triggered by another logical channel and to-be-sent data on a logical channel corresponding to the first radio interface technology.

In one embodiment, the second determining module 101 is specifically configured to:

determine a logical channel set corresponding to second information including the first information; and if a priority of a second radio interface technology corresponding to a second logical channel in the logical channel set is not higher than the priority of the first radio interface technology, cancel first information triggered by the second logical channel, where the second radio interface technology is a radio interface technology with a lowest priority in radio interface technologies corresponding to the second logical channel; or if a priority of a third radio interface technology corresponding to each logical channel in a logical channel group corresponding to the second logical channel is not higher than the priority of the first radio interface technology, cancel first information triggered by the second logical channel, where the third radio interface technology corresponding to each logical channel is a radio interface technology with a lowest priority in radio interface technologies corresponding to each logical channel in the logical channel group corresponding to the second logical channel; or if a priority of a fourth radio interface technology corresponding to each logical channel in a radio interface technology corresponding to the second logical channel is not higher than the priority of the first radio interface technology, cancel first information triggered by the second logical channel, where the fourth radio interface technology corresponding to each logical channel is a radio interface technology with a lowest priority in radio interface technologies corresponding to each logical channel in the radio interface technology corresponding to the second logical channel; or if a priority of a fifth radio interface technology corresponding to each logical channel with to-be-sent data in the logical channel set is not higher than the priority of the first radio interface technology, cancel first information triggered by the second logical channel, where the fifth radio interface technology corresponding to each logical channel with to-be-sent data is a radio interface technology with a lowest priority in radio interface technologies corresponding to each logical channel with to-be-sent data in the logical channel set.

In one embodiment, the second determining module 101 is specifically configured to:

determine a logical channel set corresponding to second information including the first information; and if a priority of a sixth radio interface technology corresponding to a third logical channel in the logical channel set is higher than the priority of the first radio interface technology, and an acknowledgement response returned by the radio access network device for the first information is received after the second information is sent by using the first radio interface technology, cancel first information triggered by the third logical channel before the second information is packetized, where the sixth radio interface technology is a radio interface technology with a lowest priority in radio interface technologies corresponding to the third logical channel; or if a priority of a seventh radio interface technology corresponding to any logical channel in a logical channel group in which a third logical channel in the logical channel set is located is higher than the priority of the first radio interface technology, and an acknowledgement response returned by the radio access network device for the first information is received after the second information is sent by using the first radio interface technology, cancel first information triggered by the third logical channel before the second information is packetized, where the seventh radio interface technology is a radio interface technology with a lowest priority in radio interface technologies corresponding to any logical channel in the logical channel group in which the third logical channel is located; or if a priority of an eighth radio interface technology corresponding to any logical channel in a radio interface technology corresponding to a third logical channel in the logical channel set is higher than the priority of the first radio interface technology, and an acknowledgement response returned by the radio access network device for the first information is received after the second information is sent by using the first radio interface technology, cancel first information triggered by the third logical channel before the second information is packetized, where the eighth radio interface technology is a radio interface technology with a lowest priority in radio interface technologies corresponding to any logical channel in the radio interface technology corresponding to the third logical channel; or if a priority of a ninth radio interface technology corresponding to any logical channel with to-be-sent data in the logical channel set is higher than the priority of the first radio interface technology, and an acknowledgement response returned by the radio access network device for the first information is received after the second information is sent by using the first radio interface technology, cancel first information triggered by the third logical channel before the second information is packetized, where the ninth radio interface technology is a radio interface technology with a lowest priority in radio interface technologies corresponding to any logical channel with to-be-sent data in the logical channel set.

In one embodiment, the second determining module 101 is specifically configured to:

determine a logical channel set corresponding to second information including the first information; and if data of a fourth logical channel in the logical channel set expires, cancel first information triggered by the fourth logical channel; or if data of all fifth logical channels in a logical channel group corresponding to the fourth logical channel expires, cancel first information triggered by the fourth logical channel before the second information is packetized, where a priority of a radio interface technology that corresponds to the fifth logical channels and that has a lowest priority is higher than the priority of the first radio interface technology; or if data of all logical channels in a logical channel group corresponding to the fourth logical channel expires, cancel first information triggered by the fourth logical channel; or if data of all sixth logical channels in all logical channels in a radio interface technology corresponding to the fourth logical channel expires, cancel first information triggered by the fourth logical channel before the second information is packetized, where a priority of a radio interface technology that corresponds to the sixth logical channels and that has a lowest priority is higher than the priority of the first radio interface technology; or if data of all logical channels in a radio interface technology corresponding to the fourth logical channel expires, cancel first information triggered by the fourth logical channel; or if data of all seventh logical channels in all logical channels with to-be-sent data in the logical channel set expires, cancel first information triggered by the fourth logical channel before the second information is packetized, where a priority of a radio interface technology that corresponds to the seventh logical channels and that has a lowest priority is higher than the priority of the first radio interface technology; or if data of all logical channels with to-be-sent data expires, cancel first information triggered by the fourth logical channel.

Figure 11:
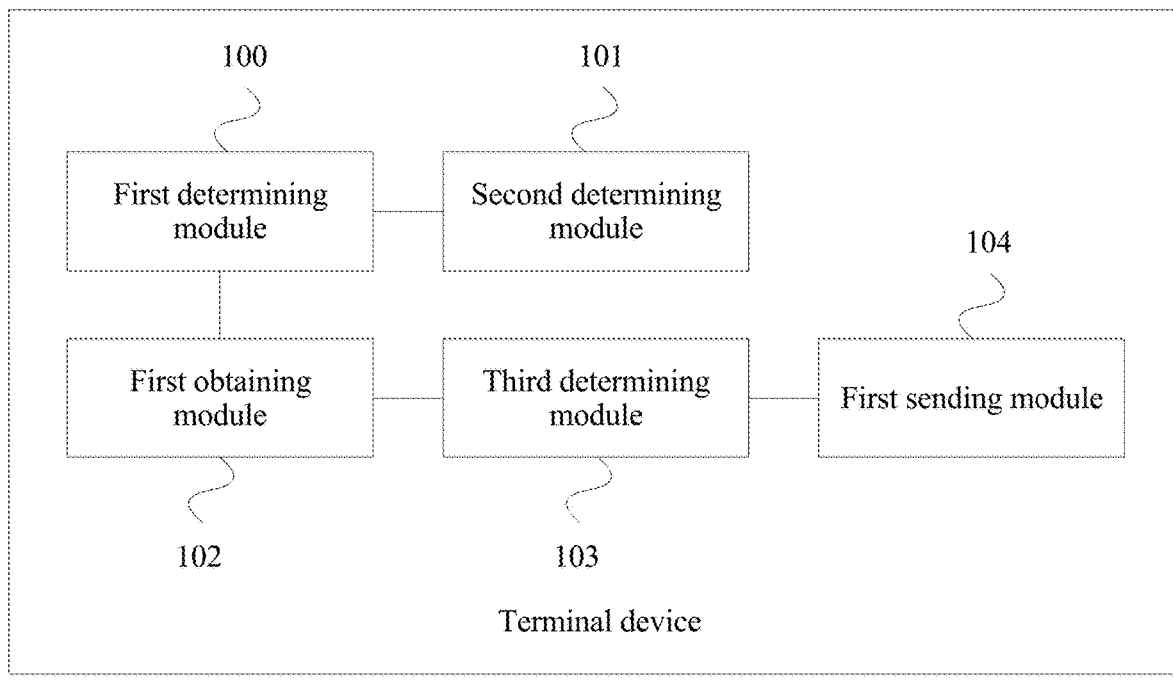
FIG. 11 is a structural diagram of another embodiment of a terminal device according to this application.

Based on the embodiment shown in FIG. 10, further, FIG. 11 is a structural diagram of another embodiment of the terminal device according to this application. As shown in FIG. 11, the terminal device may further include a first obtaining module 102, a third determining module 103, and a first sending module 104.

The first obtaining module 102 is configured to obtain a logical channel that triggers the first information. The third determining module 103 is configured to determine, as a tenth radio interface technology, a radio interface technology with a lowest priority in radio interface technologies corresponding to the logical channel that triggers the first information. The first sending module 104 is configured to: when the priority of the first radio interface technology is lower than a priority of the tenth radio interface technology, send request signaling to the radio access network device, where the request signaling is used to request to obtain an uplink resource corresponding to an eleventh radio interface technology from the radio access network device, and a priority of the eleventh radio interface technology is not lower than the priority of the tenth radio interface technology.

In one embodiment, the first obtaining module 102 and the third determining module 103 may correspond to a component such as a processor or a controller that has a processing function or a control function in the terminal device. The first sending module 104 may correspond to a transmitter or a transceiver in the terminal device.

Figure 12:
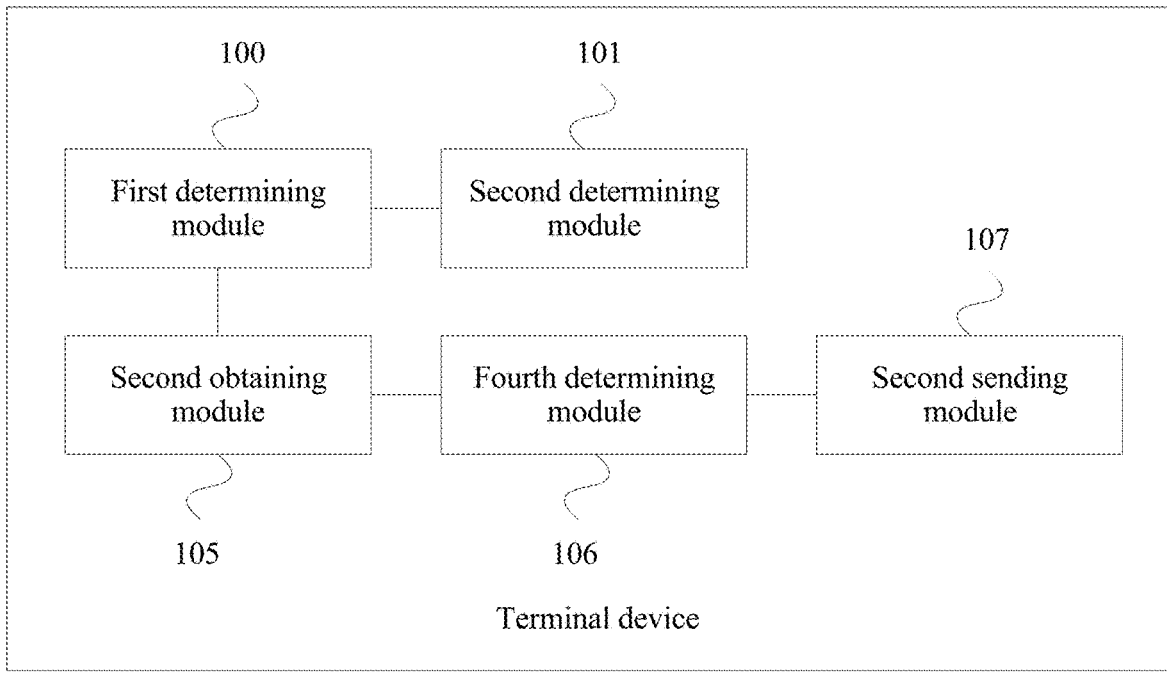
FIG. 12 is a structural diagram of another embodiment of a terminal device according to this application.

Based on the embodiment shown in FIG. 10, further, FIG. 12 is a structural diagram of another embodiment of the terminal device according to this application. As shown in FIG. 12, the terminal device may further include a second obtaining module 105, a fourth determining module 106, and a second sending module 107.

The second obtaining module 105 is configured to obtain a first logical channel group corresponding to a logical channel that triggers the first information.

The fourth determining module 106 is configured to determine radio interface technologies that correspond to all logical channels in the first logical channel group and that have lowest priorities, and determine, as a twelfth radio interface technology, a radio interface technology with a highest priority in the radio interface technologies that correspond to all logical channels in the first logical channel group and that have lowest priorities.

The second sending module 107 is configured to: when the priority of the first radio interface technology is lower than a priority of the twelfth radio interface technology, send request signaling to the radio access network device, where the request signaling is used to request to obtain an uplink resource corresponding to a thirteenth radio interface technology from the radio access network device, and a priority of the thirteenth radio interface technology is not lower than the priority of the twelfth radio interface technology.

In one embodiment, the second obtaining module 105 and the fourth determining module 106 may correspond to a component such as a processor or a controller that has a processing function or a control function in the terminal device. The second sending module 107 may correspond to a transmitter or a transceiver in the terminal device.

Figure 13:
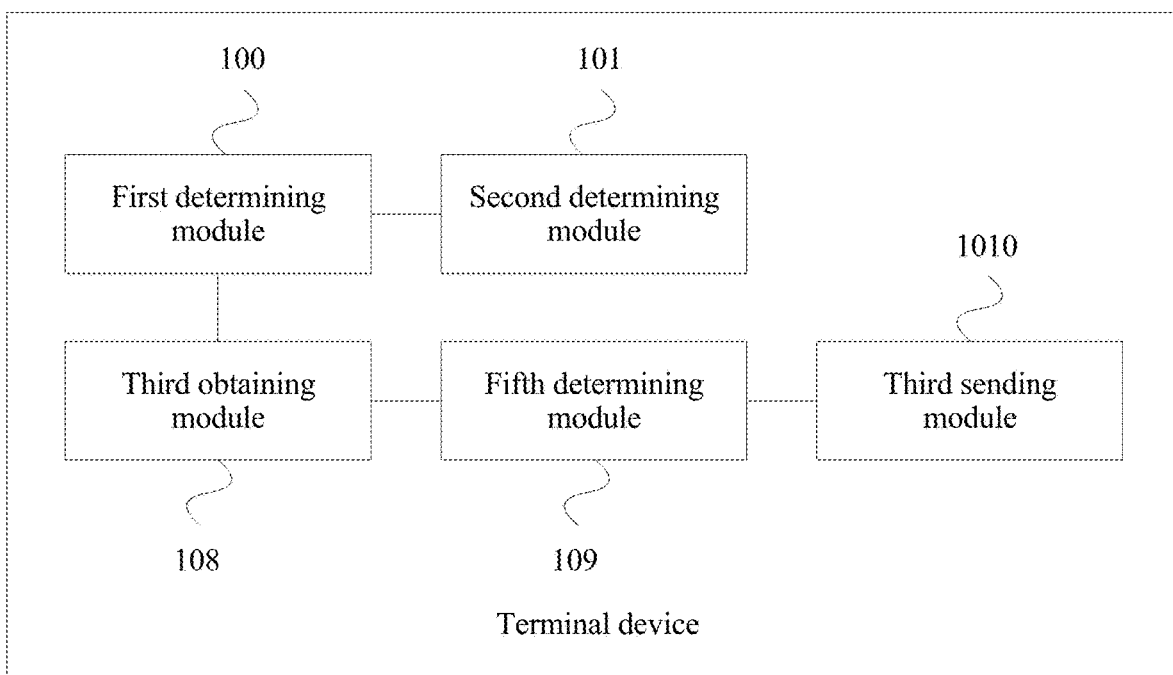
FIG. 13 is a structural diagram of another embodiment of a terminal device according to this application.

Based on the embodiment shown in FIG. 10, further, FIG. 13 is a structural diagram of another embodiment of the terminal device according to this application. As shown in FIG. 13, the terminal device may further include a third obtaining module 108, a fifth determining module 109, and a third sending module 1010.

The third obtaining module 108 is configured to obtain a fourteenth radio interface technology corresponding to a logical channel that triggers the first information.

The fifth determining module 109 is configured to determine radio interface technologies that correspond to all logical channels in the fourteenth radio interface technology and that have lowest priorities, and determine, as a fifteenth radio interface technology, a radio interface technology with a highest priority in the radio interface technologies that correspond to all logical channels in the fourteenth radio interface technology and that have lowest priorities.

The third sending module 1010 is configured to: when the priority of the first radio interface technology is lower than a priority of the fifteenth radio interface technology, send request signaling to the radio access network device, where the request signaling is used to request to obtain an uplink resource corresponding to a sixteenth radio interface technology from the radio access network device, and a priority of the sixteenth radio interface technology is not lower than the priority of the fifteenth radio interface technology.

In one embodiment, the third obtaining module 108 and the fifth determining module 109 may correspond to a component such as a processor or a controller that has a processing function or a control function in the terminal device. The third sending module 1010 may correspond to a transmitter or a transceiver in the terminal device.

Figure 14:
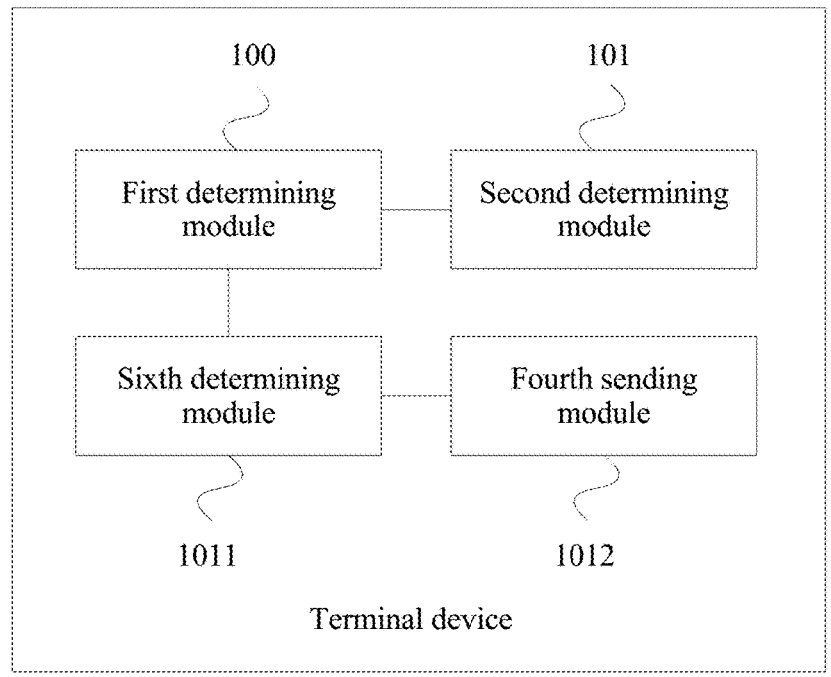
FIG. 14 is a structural diagram of another embodiment of a terminal device according to this application.

Based on the embodiment shown in FIG. 10, further, FIG. 14 is a structural diagram of another embodiment of the terminal device according to this application. As shown in FIG. 14, the terminal device may further include a sixth determining module 1011 and a fourth sending module 1012.

The sixth determining module 1011 is configured to: determine radio interface technologies that correspond to all logical channels of the terminal device and that have lowest priorities, and determine, as a seventeenth radio interface technology, a radio interface technology with a highest priority in the radio interface technologies that correspond to all logical channels of the terminal device and that have lowest priorities.

The fourth sending module 1012 is configured to: when the priority of the first radio interface technology is lower than a priority of the seventeenth radio interface technology, send request signaling to the radio access network device, where the request signaling is used to request to obtain an uplink resource corresponding to an eighteenth radio interface technology from the radio access network device, and a priority of the eighteenth radio interface technology is not lower than the priority of the seventeenth radio interface technology.

In one embodiment, the sixth determining module 1011 may correspond to a component such as a processor or a controller that has a processing function or a control function in the terminal device. The fourth sending module 1012 may correspond to a transmitter or a transceiver in the terminal device.

Figure 15:
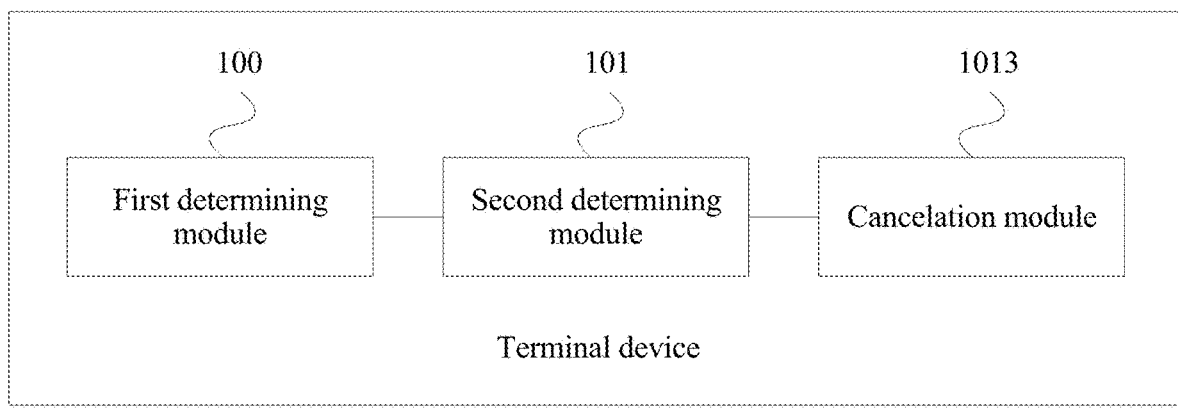
FIG. 15 is a structural diagram of another embodiment of a terminal device according to this application.

In one embodiment, based on the foregoing embodiments, further, FIG. 15 is a structural diagram of another embodiment of the terminal device according to this application. As shown in FIG. 15, the terminal device may further include a cancellation module 1013. The cancellation module 1013 is configured to: if the first information is canceled, cancel request signaling triggered by the first information.

In one embodiment, the cancellation module 1013 may correspond to a component such as a processor or a controller that has a processing function or a control function in the terminal device.

In one embodiment, the first information is a buffer status report BSR, and second information including the first information is a buffer status report media access control control element (BSR MAC CE); and the BSR MAC CE includes an identifier of a logical channel that triggers the BSR and a size of to-be-sent data on the logical channel that triggers the BSR, and the BSR is used to indicate, to the radio access network device, a size of to-be-sent data on a logical channel that triggers the first information; or the BSR MAC CE includes an identifier of any logical channel in a first logical channel group in which a logical channel that triggers the BSR is located and a size of to-be-sent data of the any logical channel; or the BSR MAC CE includes an identifier of any logical channel in a radio interface technology corresponding to a logical channel that triggers the BSR and a size of to-be-sent data of the any logical channel; or the BSR MAC CE includes an identifier of any logical channel of the terminal device and a size of to-be-sent data of the any logical channel.

In one embodiment, the first information is a buffer status report BSR, and second information including the first information is a buffer status report media access control control element (BSR MAC CE); and the BSR MAC CE includes an identifier of at least one logical channel in a first logical channel group in which a logical channel that triggers the BSR is located and a size of to-be-sent data of the at least one logical channel; or the BSR MAC CE includes a group identifier of at least one logical channel group in a radio interface technology corresponding to a logical channel that triggers the BSR and a size of to-be-sent data of the at least one logical channel group; or the BSR MAC CE includes an identifier of at least one logical channel in all logical channels of the terminal device and a size of to-be-sent data of the at least one logical channel; or the BSR MAC CE includes an identifier of at least one logical channel group in all logical channel groups of the terminal device and a size of to-be-sent data of the at least one logical channel group.

The terminal device provided in this application can execute the foregoing embodiments of the information processing method. Implementation principles and technical effects thereof are similar, and details are not described herein again.

Figure 16:
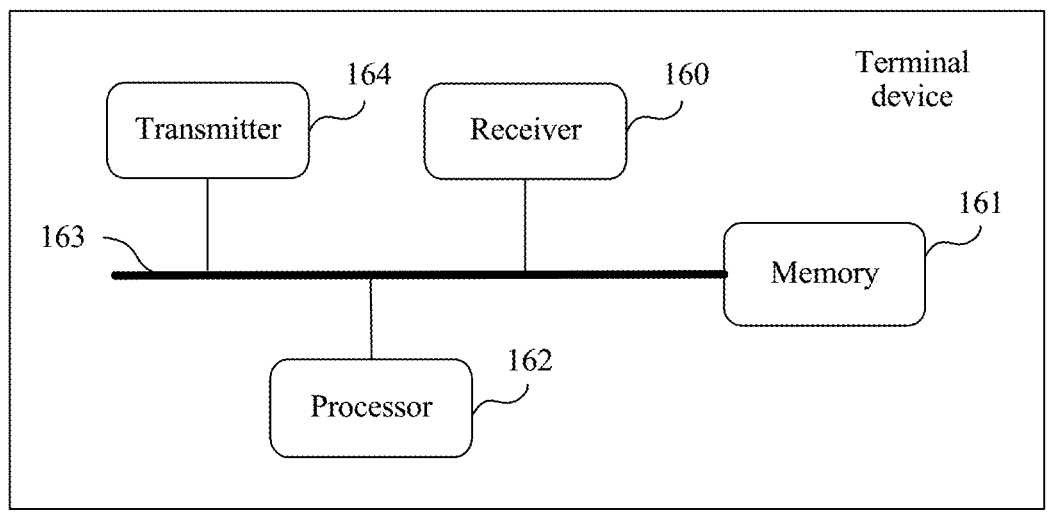
FIG. 16 is a structural diagram of another embodiment of a terminal device according to this application.

FIG. 16 is a structural diagram of another embodiment of a terminal device according to this application. As shown in FIG. 16, the terminal device may include a receiver 160, a memory 161, a processor 162, and at least one communications bus 163. The communications bus 163 is configured to implement a communication connection between components. The memory 161 may include a high-speed RAM memory, or may include a non-volatile memory NVM, for example, at least one disk memory. The memory 161 may store various programs, to complete various processing functions and implement method operations in this embodiment. In one embodiment, the terminal device may further include a transmitter 164. In this embodiment, the receiver 160 may be a radio frequency processing module or a baseband processing module in the terminal device, and the transmitter 164 may also be a radio frequency processing module or a baseband processing module in the terminal device. The transmitter 164 and the receiver 160 are both coupled to the processor 162.

Specifically, in this embodiment, the processor 162 is configured to: determine, from at least one radio interface technology, a first radio interface technology used to send first information; and determine, based on the first information and attribute information of the first radio interface technology, whether to cancel the first information that is in a triggered state, where each of the at least one radio interface technology corresponds to an uplink resource, the first information includes a size of to-be-sent data of at least one logical channel of the terminal device, and the attribute information of the first radio interface technology includes a priority of the first radio interface technology or an uplink resource corresponding to the first radio interface technology.

In one embodiment, the first radio interface technology is a radio interface technology with a highest priority in the at least one radio interface technology.

In one embodiment, the processor 162 is specifically configured to: when a maximum transmission data volume of the uplink resource corresponding to each of the at least one radio interface technology is greater than or equal to a size of to-be-sent data on a logical channel corresponding to each radio interface technology, and a maximum transmission data volume of a remaining resource in the first radio interface technology is less than a size of second information including the first information, cancel all first information that is in the triggered state, where the remaining resource in the first radio interface technology is a resource excluding the uplink resource in the first radio interface technology occupied by to-be-sent data on a logical channel, the logical channel corresponding to the first radio interface technology.

In one embodiment, the processor 162 is specifically configured to: when a maximum transmission data volume of an uplink resource corresponding to any one of the at least one radio interface technology is greater than or equal to a size of to-be-sent data on any first logical channel corresponding to the any radio interface technology, and a maximum transmission data volume of a remaining resource in the first radio interface technology is less than a size of first information triggered by the first logical channel, cancel the first information triggered by the first logical channel; or when a size of to-be-sent data on each logical channel in a logical channel group in which the first logical channel is located is less than or equal to a maximum transmission data volume of an uplink resource in a radio interface technology corresponding to each logical channel in the logical channel group, and a maximum transmission data volume of a remaining resource in the first radio interface technology is less than a size of first information triggered by the first logical channel, cancel the first information triggered by the first logical channel; or when a size of to-be-sent data on each logical channel in a radio interface technology corresponding to the first logical channel is less than or equal to a maximum transmission data volume of an uplink resource in a radio interface technology corresponding to each logical channel in the radio interface technology corresponding to the first logical channel, and a maximum transmission data volume of a remaining resource in the first radio interface technology is less than a size of first information triggered by the first logical channel, cancel the first information triggered by the first logical channel, where the remaining resource in the first radio interface technology is a resource excluding the uplink resource in the first radio interface technology occupied by first information triggered by another logical channel and to-be-sent data on a logical channel corresponding to the first radio interface technology.

In one embodiment, the processor 162 is specifically configured to: determine a logical channel set corresponding to second information including the first information; and when a priority of a second radio interface technology corresponding to a second logical channel in the logical channel set is not higher than the priority of the first radio interface technology, cancel first information triggered by the second logical channel, where the second radio interface technology is a radio interface technology with a lowest priority in radio interface technologies corresponding to the second logical channel; or when a priority of a third radio interface technology corresponding to each logical channel in a logical channel group corresponding to the second logical channel is not higher than the priority of the first radio interface technology, cancel first information triggered by the second logical channel, where the third radio interface technology corresponding to each logical channel is a radio interface technology with a lowest priority in radio interface technologies corresponding to each logical channel in the logical channel group corresponding to the second logical channel; or when a priority of a fourth radio interface technology corresponding to each logical channel in a radio interface technology corresponding to the second logical channel is not higher than the priority of the first radio interface technology, cancel first information triggered by the second logical channel, where the fourth radio interface technology corresponding to each logical channel is a radio interface technology with a lowest priority in radio interface technologies corresponding to each logical channel in the radio interface technology corresponding to the second logical channel; or when a priority of a fifth radio interface technology corresponding to each logical channel with to-be-sent data in the logical channel set is not higher than the priority of the first radio interface technology, cancel first information triggered by the second logical channel, where the fifth radio interface technology corresponding to each logical channel with to-be-sent data is a radio interface technology with a lowest priority in radio interface technologies corresponding to each logical channel with to-be-sent data in the logical channel set.

In one embodiment, the processor 162 is specifically configured to: determine a logical channel set corresponding to second information including the first information; and when a priority of a sixth radio interface technology corresponding to a third logical channel in the logical channel set is higher than the priority of the first radio interface technology, and an acknowledgement response returned by the radio access network device for the first information is received after the second information is sent by using the first radio interface technology, cancel first information triggered by the third logical channel before the second information is packetized, where the sixth radio interface technology is a radio interface technology with a lowest priority in radio interface technologies corresponding to the third logical channel; or when a priority of a seventh radio interface technology corresponding to any logical channel in a logical channel group in which a third logical channel in the logical channel set is located is higher than the priority of the first radio interface technology, and an acknowledgement response returned by the radio access network device for the first information is received after the second information is sent by using the first radio interface technology, cancel first information triggered by the third logical channel before the second information is packetized, where the seventh radio interface technology is a radio interface technology with a lowest priority in radio interface technologies corresponding to any logical channel in the logical channel group in which the third logical channel is located; or when a priority of an eighth radio interface technology corresponding to any logical channel in a radio interface technology corresponding to a third logical channel in the logical channel set is higher than the priority of the first radio interface technology, and an acknowledgement response returned by the radio access network device for the first information is received after the second information is sent by using the first radio interface technology, cancel first information triggered by the third logical channel before the second information is packetized, where the eighth radio interface technology is a radio interface technology with a lowest priority in radio interface technologies corresponding to any logical channel in the radio interface technology corresponding to the third logical channel; or when a priority of a ninth radio interface technology corresponding to any logical channel with to-be-sent data in the logical channel set is higher than the priority of the first radio interface technology, and an acknowledgement response returned by the radio access network device for the first information is received after the second information is sent by using the first radio interface technology, cancel first information triggered by the third logical channel before the second information is packetized, where the ninth radio interface technology is a radio interface technology with a lowest priority in radio interface technologies corresponding to any logical channel with to-be-sent data in the logical channel set.

In one embodiment, the processor 162 is specifically configured to: determine a logical channel set corresponding to second information including the first information; and when data of a fourth logical channel in the logical channel set expires, cancel first information triggered by the fourth logical channel; or when data of all fifth logical channels in a logical channel group corresponding to the fourth logical channel expires, cancel first information triggered by the fourth logical channel before the second information is packetized, where a priority of a radio interface technology that corresponds to the fifth logical channels and that has a lowest priority is higher than the priority of the first radio interface technology; or when data of all logical channels in a logical channel group corresponding to the fourth logical channel expires, cancel first information triggered by the fourth logical channel; or when data of all sixth logical channels in all logical channels in a radio interface technology corresponding to the fourth logical channel expires, cancel first information triggered by the fourth logical channel before the second information is packetized, where a priority of a radio interface technology that corresponds to the sixth logical channels and that has a lowest priority is higher than the priority of the first radio interface technology; or when data of all logical channels in a radio interface technology corresponding to the fourth logical channel expires, cancel first information triggered by the fourth logical channel; or when data of all seventh logical channels in all logical channels with to-be-sent data in the logical channel set expires, cancel first information triggered by the fourth logical channel before the second information is packetized, where a priority of a radio interface technology that corresponds to the seventh logical channels and that has a lowest priority is higher than the priority of the first radio interface technology; or when data of all logical channels with to-be-sent data expires, cancel first information triggered by the fourth logical channel.

In one embodiment, the processor 162 is further configured to: obtain a logical channel that triggers the first information, and determine, as a tenth radio interface technology, a radio interface technology with a lowest priority in radio interface technologies corresponding to the logical channel that triggers the first information; and the transmitter 164 is configured to: when the priority of the first radio interface technology is lower than a priority of the tenth radio interface technology, send request signaling to the radio access network device, where the request signaling is used to request to obtain an uplink resource corresponding to an eleventh radio interface technology from the radio access network device, and a priority of the eleventh radio interface technology is not lower than the priority of the tenth radio interface technology.

In one embodiment, the processor 162 is further configured to: obtain a first logical channel group corresponding to a logical channel that triggers the first information, determine radio interface technologies that correspond to all logical channels in the first logical channel group and that have lowest priorities, and determine, as a twelfth radio interface technology, a radio interface technology with a highest priority in the radio interface technologies that correspond to all logical channels in the first logical channel group and that have lowest priorities; and the transmitter 164 is further configured to: when the priority of the first radio interface technology is lower than a priority of the twelfth radio interface technology, send request signaling to the radio access network device, where the request signaling is used to request to obtain an uplink resource corresponding to a thirteenth radio interface technology from the radio access network device, and a priority of the thirteenth radio interface technology is not lower than the priority of the twelfth radio interface technology.

In one embodiment, the processor 162 is further configured to: obtain a fourteenth radio interface technology corresponding to a logical channel that triggers the first information, determine radio interface technologies that correspond to all logical channels in the fourteenth radio interface technology and that have lowest priorities, and determine, as a fifteenth radio interface technology, a radio interface technology with a highest priority in the radio interface technologies that correspond to all logical channels in the fourteenth radio interface technology and that have lowest priorities; and the transmitter 164 is further configured to: when the priority of the first radio interface technology is lower than a priority of the fifteenth radio interface technology, send request signaling to the radio access network device, where the request signaling is used to request to obtain an uplink resource corresponding to a sixteenth radio interface technology from the radio access network device, and a priority of the sixteenth radio interface technology is not lower than the priority of the fifteenth radio interface technology.

In one embodiment, the processor 162 is further configured to: determine radio interface technologies that correspond to all logical channels of the terminal device and that have lowest priorities, and determine, as a seventeenth radio interface technology, a radio interface technology with a highest priority in the radio interface technologies that correspond to all logical channels of the terminal device and that have lowest priorities; and the transmitter 164 is further configured to: when the priority of the first radio interface technology is lower than a priority of the seventeenth radio interface technology, send request signaling to the radio access network device, where the request signaling is used to request to obtain an uplink resource corresponding to an eighteenth radio interface technology from the radio access network device, and a priority of the eighteenth radio interface technology is not lower than the priority of the seventeenth radio interface technology.

In one embodiment, the processor 162 is further configured to: if the first information is canceled, cancel request signaling triggered by the first information.

In one embodiment, the first information is a buffer status report BSR, and second information including the first information is a buffer status report media access control control element (BSR MAC CE); and the BSR MAC CE includes an identifier of a logical channel that triggers the BSR and a size of to-be-sent data on the logical channel that triggers the BSR, and the BSR is used to indicate, to the radio access network device, a size of to-be-sent data on a logical channel that triggers the first information; or the BSR MAC CE includes an identifier of any logical channel in a first logical channel group in which a logical channel that triggers the BSR is located and a size of to-be-sent data of the any logical channel; or the BSR MAC CE includes an identifier of any logical channel in a radio interface technology corresponding to a logical channel that triggers the BSR and a size of to-be-sent data of the any logical channel; or the BSR MAC CE includes an identifier of any logical channel of the terminal device and a size of to-be-sent data of the any logical channel.

In one embodiment, the first information is a buffer status report BSR, and second information including the first information is a buffer status report media access control control element (BSR MAC CE); and the BSR MAC CE includes an identifier of at least one logical channel in a first logical channel group in which a logical channel that triggers the BSR is located and a size of to-be-sent data of the at least one logical channel; or the BSR MAC CE includes a group identifier of at least one logical channel group in a radio interface technology corresponding to a logical channel that triggers the BSR and a size of to-be-sent data of the at least one logical channel group; or the BSR MAC CE includes an identifier of at least one logical channel in all logical channels of the terminal device and a size of to-be-sent data of the at least one logical channel; or the BSR MAC CE includes an identifier of at least one logical channel group in all logical channel groups of the terminal device and a size of to-be-sent data of the at least one logical channel group.

According to the terminal device provided in this application, the transmitter, the processor, and the receiver can execute sending, processing, and receiving actions in the embodiments of the information processing method. Implementation principles and technical effects thereof are similar, and details are not described herein again.

Method or algorithm operations described in combination with the content disclosed in this application may be implemented by hardware, or may be implemented by a processor by executing a software instruction, or may be implemented by a computer program product. The software instruction may be formed by a corresponding software module. The software module may be located in a RAM memory, a flash memory, a ROM memory, an EPROM memory, an EEPROM memory, a register, a hard disk, a removable hard disk, a CD-ROM, or a storage medium of any other form known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, functions described in this application may be implemented by hardware, software, firmware, or any combination thereof. When being implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the several embodiments provided in this application, it should be understood that the disclosed system, device, and method may be implemented in other manners without departing from the scope of this application. For example, the described embodiment is merely an example. For example, the module or unit division is merely logical function division and may be other division in actual implementation. For example, a plurality of units or components may be combined or integrated into another system, or some features may be ignored or not performed. The units described as separate parts may or may not be physically separate, and parts displayed as units may or may not be physical units, may be located in one position, or may be distributed on a plurality of network units. Some or all of the modules may be selected according to actual needs to achieve the objectives of the solutions of the embodiments.

In addition, the described system, device, method, and schematic diagrams of different embodiments can be combined or integrated with another system, module, technology, or method without departing from the scope of this application. In addition, the displayed or discussed mutual couplings or direct couplings or communication connections may be implemented by using some interfaces. The indirect couplings or communication connections between the apparatuses or units may be implemented in electronic, mechanical, or other forms.

What is claimed is:

1. An information processing method, comprising:
   determining, by a terminal device from at least one radio interface technology, a first radio interface technology used to send first information, wherein each of the at least one radio interface technology corresponds to an uplink resource, and the first information comprises a size of to-be-sent data of at least one logical channel of the terminal device, each of the at least one radio interface technology corresponding to one or more logical channels of the at least one logical channel;
   triggering, by the terminal device based on the to-be-sent data of the at least one logical channel, the first information in a triggered state; and
   determining, by the terminal device based on the first information and attribute information of the first radio interface technology, whether to cancel the first information that is in the triggered state, wherein the attribute information of the first radio interface technology comprises a priority of the first radio interface technology or an uplink resource corresponding to the first radio interface technology, wherein the determining, by the terminal device based on the first information and attribute information of the first radio interface technology, whether to cancel the first information that is in the triggered state comprises:
- determining that a maximum transmission data volume of the uplink resource corresponding to any one of the at least one radio interface technology is greater than or equal to a size of to-be-sent data on any first logical channel corresponding to the one radio interface technology, and a maximum transmission data volume of a remaining resource in the first radio interface technology is less than a size of first information triggered by the first logical channel; and
- canceling, by the terminal device, the first information triggered by the first logical channel, wherein the remaining resource in the first radio interface technology is a resource excluding the uplink resource in the first radio interface technology occupied by first information triggered by another logical channel corresponding to the first radio interface technology and to-be-sent data on any logical channel corresponding to the first radio interface technology.

2. The method according to claim 1, wherein the first radio interface technology is a radio interface technology with a highest priority in the at least one radio interface technology.

3. An information processing method, comprising:
- determining, by a terminal device from at least one radio interface technology, a first radio interface technology used to send first information, wherein each of the at least one radio interface technology corresponds to an uplink resource, and the first information comprises a size of to-be-sent data of at least one logical channel of the terminal device, each of the at least one radio interface technology corresponding to one or more logical channels of the at least one logical channel;
- triggering, by the terminal device based on the to-be-sent data of the at least one logical channel, the first information in a triggered state; and
- determining, by the terminal device based on the first information and attribute information of the first radio interface technology, whether to cancel the first information that is in the triggered state, wherein the attribute information of the first radio interface technology comprises a priority of the first radio interface technology or an uplink resource corresponding to the first radio interface technology, wherein the determining, by the terminal device based on the first information and attribute information of the first radio interface technology, whether to cancel the first information that is in the triggered state comprises:
  - determining that a size of to-be-sent data on each logical channel in a logical channel group in which a first logical channel is located is less than or equal to a maximum transmission data volume of an uplink resource in a radio interface technology corresponding to each of the logical channel in the logical channel group, and a maximum transmission data volume of a remaining resource in the first radio interface technology is less than a size of first information triggered by the first logical channel, or determining that a size of to-be-sent data on each logical channel in a radio interface technology corresponding to a first logical channel is less than or equal to a maximum transmission data volume of an uplink resource in a radio interface technology corresponding to each of the logical channel in the radio interface technology corresponding to the first logical channel, and a maximum transmission data volume of a remaining resource in the first radio interface technology is less than a size of first information triggered by the first logical channel; and
  - canceling, by the terminal device, the first information triggered by the first logical channel, wherein the remaining resource in the first radio interface technology is a resource excluding the uplink resource in the first radio interface technology occupied by first information triggered by another logical channel corresponding to the first radio interface technology and to-be-sent data on any logical channel corresponding to the first radio interface technology.

4. An information processing method, comprising:
- determining, by a terminal device from at least one radio interface technology, a first radio interface technology used to send first information, wherein each of the at least one radio interface technology corresponds to an uplink resource, and the first information comprises a size of to-be-sent data of at least one logical channel of the terminal device, each of the at least one radio interface technology corresponding to one or more logical channels of the at least one logical channel;
- triggering, by the terminal device based on the to-be-sent data of the at least one logical channel, the first information in a triggered state; and
- determining, by the terminal device based on the first information and attribute information of the first radio interface technology, whether to cancel the first information that is in the triggered state, wherein the attribute information of the first radio interface technology comprises a priority of the first radio interface technology or an uplink resource corresponding to the first radio interface technology, wherein the first radio interface technology is a radio interface technology with a highest priority in the at least one radio interface technology, wherein the determining, by the terminal device based on the first information and attribute information of the first radio interface technology, whether to cancel the first information that is in the triggered state comprises:
  - determining, by the terminal device, a logical channel set corresponding to second information, wherein the second information comprises the first information;
  - determining that a priority of a third radio interface technology corresponding to each logical channel in a logical channel group corresponding to a second logical channel is not higher than the priority of the first radio interface technology, wherein the third radio interface technology is a radio interface technology with a lowest priority in the at least one radio interface technology corresponding to each of the logical channel in the logical channel group corresponding to the second logical channel, or determining that a priority of a fourth radio interface technology corresponding to each logical channel in a radio interface technology corresponding to a second logical channel is not higher than the priority of the first radio interface technology, wherein the fourth radio interface technology is a radio interface technology with a lowest priority in the at least one radio interface technology corresponding to each of the logical channel in the radio interface technology corresponding to the second logical channel, or determining that a priority of a fifth radio interface technology corresponding to each logical channel with to-be-sent data in the logical channel set is not higher than the priority of the first radio interface technology, wherein the fifth radio interface technology is a radio interface technology with a lowest priority in the at least one radio interface technology corresponding to each logical channel with to-be-sent data in the logical channel set; and canceling, by the terminal device, first information triggered by the second logical channel.

5. An apparatus, comprising a processor and a memory having instructions, wherein the instructions are executed by the processor to cause the apparatus to:

determine, from at least one radio interface technology, a first radio interface technology used to send first information, wherein each of the at least one radio interface technology corresponds to an uplink resource, and the first information comprises a size of to-be-sent data of at least one logical channel of the apparatus, each of the at least one radio interface technology corresponding to one or more logical channels of the at least one logical channel;

trigger the first information in a triggered state based on the to-be-sent data of the at least one logical channel; and determine, based on the first information and attribute information of the first radio interface technology, whether to cancel the first information that is in the triggered state, wherein the attribute information of the first radio interface technology comprises a priority of the first radio interface technology or an uplink resource corresponding to the first radio interface technology, wherein to determine, based on the first information and attribute information of the first radio interface technology, whether to cancel the first information that is in the triggered state, the apparatus is further caused to:

determine that a maximum transmission data volume of the uplink resource corresponding to any one of the at least one radio interface technology is greater than or equal to a size of to-be-sent data on any first logical channel corresponding to the one radio interface technology, and a maximum transmission data volume of a remaining resource in the first radio interface technology is less than a size of first information triggered by the first logical channel; and cancel the first information triggered by the first logical channel, wherein the remaining resource in the first radio interface technology is a resource excluding the uplink resource in the first radio interface technology occupied by first information triggered by another logical channel corresponding to the first radio interface technology and to-be-sent data on any logical channel corresponding to the first radio interface technology.

6. The apparatus according to claim 5, wherein the first radio interface technology is a radio interface technology with a highest priority in the at least one radio interface technology.

7. An apparatus, comprising a processor and a memory having instructions, wherein the instructions are executed by the processor to cause the apparatus to:

determine, from at least one radio interface technology, a first radio interface technology used to send first information, wherein each of the at least one radio interface technology corresponds to an uplink resource, and the first information comprises a size of to-be-sent data of at least one logical channel of the apparatus, each of the at least one radio interface technology corresponding to one or more logical channels of the at least one logical channel;

trigger the first information in a triggered state based on the to-be-sent data of the at least one logical channel; and determine, based on the first information and attribute information of the first radio interface technology, whether to cancel the first information that is in the triggered state, wherein the attribute information of the first radio interface technology comprises a priority of the first radio interface technology or an uplink resource corresponding to the first radio interface technology, wherein to determine, based on the first information and attribute information of the first radio interface technology, whether to cancel the first information that is in the triggered state, the apparatus is further caused to:

determine that a size of to-be-sent data on each logical channel in a logical channel group in which a first logical channel is located is less than or equal to a maximum transmission data volume of an uplink resource in a radio interface technology corresponding to each of the logical channel in the logical channel group, and a maximum transmission data volume of a remaining resource in the first radio interface technology is less than a size of first information triggered by the first logical channel, or determine that a size of to-be-sent data on each logical channel in a radio interface technology corresponding to a first logical channel is less than or equal to a maximum transmission data volume of an uplink resource in a radio interface technology corresponding to each of the logical channel in the radio interface technology corresponding to the first logical channel, and a maximum transmission data volume of a remaining resource in the first radio interface technology is less than a size of first information triggered by the first logical channel; and cancel the first information triggered by the first logical channel, wherein the remaining resource in the first radio interface technology is a resource excluding the uplink resource in the first radio interface technology occupied by first information triggered by another logical channel corresponding to the first radio interface technology and to-be-sent data on any logical channel corresponding to the first radio interface technology.

8. An apparatus, comprising a processor and a memory having instructions, wherein the instructions are executed by the processor to cause the apparatus to:

determine, from at least one radio interface technology, a first radio interface technology used to send first information, wherein each of the at least one radio interface technology corresponds to an uplink resource, and the first information comprises a size of to-be-sent data of at least one logical channel of the apparatus, each of the at least one radio interface technology corresponding to one or more logical channels of the at least one logical channel;

trigger the first information in a triggered state based on the to-be-sent data of the at least one logical channel; and determine, based on the first information and attribute information of the first radio interface technology, whether to cancel the first information that is in the triggered state, wherein the attribute information of the first radio interface technology comprises a priority of the first radio interface technology or an uplink resource corresponding to the first radio interface technology, wherein the first radio interface technology is a radio interface technology with a highest priority in the at least one radio interface technology, wherein to determine, based on the first information and attribute information of the first radio interface technology, whether to cancel the first information that is in the triggered state, the apparatus is further caused to:

determine a logical channel set corresponding to second information, wherein the second information comprises the first information;

determine that a priority of a third radio interface technology corresponding to each logical channel in a logical channel group corresponding to a second logical channel is not higher than the priority of the first radio interface technology, wherein the third radio interface technology is a radio interface technology with a lowest priority in the at least one radio interface technology corresponding to each of the logical channel in the logical channel group corresponding to the second logical channel, or determine that a priority of a fourth radio interface technology corresponding to each logical channel in a radio interface technology corresponding to a second logical channel is not higher than the priority of the first radio interface technology, wherein the fourth radio interface technology is a radio interface technology with a lowest priority in the at least one radio interface technology corresponding to each of the logical channel in the radio interface technology corresponding to the second logical channel, or determine that a priority of a fifth radio interface technology corresponding to each logical channel with to-be-sent data in the logical channel set is not higher than the priority of the first radio interface technology, wherein the fifth radio interface technology is a radio interface technology with a lowest priority in the at least one radio interface technology corresponding to each logical channel with to-be-sent data in the logical channel set; and cancel first information triggered by the second logical channel.

* * * * *